(12) United States Patent 
Ji et al.

(10) Patent No.: US 12,593,312 B2 
(45) Date of Patent: Mar. 31, 2026

(54) SIDELINK RESOURCE RESELECTION METHOD AND APPARATUS

(71) Applicant: 1FINITY Inc., Kawasaki (JP)

(72) Inventors: Pengyu Ji, Beijing (CN); Jian Zhang, Beijing (CN); Guorong Li, Beijing (CN); Lei Zhang, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 585 days.

(21) Appl. No.: 17/954,747

(22) Filed: Sep. 28, 2022

(65) Prior Publication Data

US 2023/0022691 A1      Jan. 26, 2023

Related U.S. Application Data

(63) Continuation of application No. PCT/CN2020/084044, filed on Apr. 9, 2020.

(51) Int. Cl. 
*H04W 72/02* (2009.01)

(52) U.S. Cl. 
CPC .................................. *H04W 72/02* (2013.01)

(58) Field of Classification Search 
CPC ........ H04W 72/02; H04W 72/04; H04W 4/40 
See application file for complete search history.

(56) References Cited

U.S. PATENT DOCUMENTS

2018/0359787 A1* 12/2018 Lee .................... H04W 74/0825 
2019/0223179 A1*  7/2019 Sun ....................... H04W 72/56

2020/0280961 A1*  9/2020 Lee .......................... H04W 4/40 
2020/0374861 A1* 11/2020 Shilov ...................... H04W 4/46 
2021/0144726 A1*  5/2021 Hui ....................... H04B 17/318 
2022/0377748 A1* 11/2022 He ........................... H04W 4/70 
2023/0020105 A1*  1/2023 Shin ................... H04W 72/542 
2023/0028098 A1*  1/2023 Lin .................. H04W 72/0446

FOREIGN PATENT DOCUMENTS

CN       106937380 A       7/2017 
CN       110891289 A       3/2020 
WO     2019/066629 A1      4/2019

OTHER PUBLICATIONS

International Search Report and Written Opinion of the International Searching Authority issued by the China National Intellectual Property Administration for corresponding International Patent Application No. PCT/CN2020/084044, mailed on Jan. 8, 2021, with an English translation.

(Continued)

*Primary Examiner* — Michael J Moore, Jr. 
*Assistant Examiner* — Sang C Lee 
(74) *Attorney, Agent, or Firm* — Myers Wolin, LLC

(57) ABSTRACT

A sidelink resource reselection method and apparatus. The method includes performing resource re-evaluation and/or pre-emption check on sidelink resources initially selected for performing a plurality of times of transmission of a transport block, and reselecting at least one sidelink resource from a sidelink resource set in a case where one or more sidelink resources are not in a reselection candidate resource set, wherein a currently reselected sidelink resource set is determined according to time frequency sources of the initially selected sidelink resources.

18 Claims, 9 Drawing Sheets

(56)     References Cited

OTHER PUBLICATIONS

Corrected International Search Report of the International Searching Authority issued by the China National Intellectual Property Administration for corresponding International Patent Application No. PCT/CN2020/084044, mailed on Oct. 20, 2021, with an English translation.
Intel Corporation, "Summary#4 for AI 7.2.4.2.2 Mode-2 Resource Allocation", Agenda Item: 7.2.4.2.2, 3GPP TSG-RAN WG1 Meeting #99, R1-1913569, Reno, Nevada, USA, Nov. 18-22, 2019.

* cited by examiner

Resource selection
(reselection)

301 resource re-evaluation and/or pre-emption check are/is performed on sidelink resources initially selected for performing a plurality of times of transmission of a transport block

302 at least one sidelink resource is reselected from a sidelink resource set in a case where one or more sidelink resources are not in a reselection candidate resource set; wherein a currently reselected sidelink resource set is determined according to time frequency sources of the initially selected sidelink resources

Fig. 3

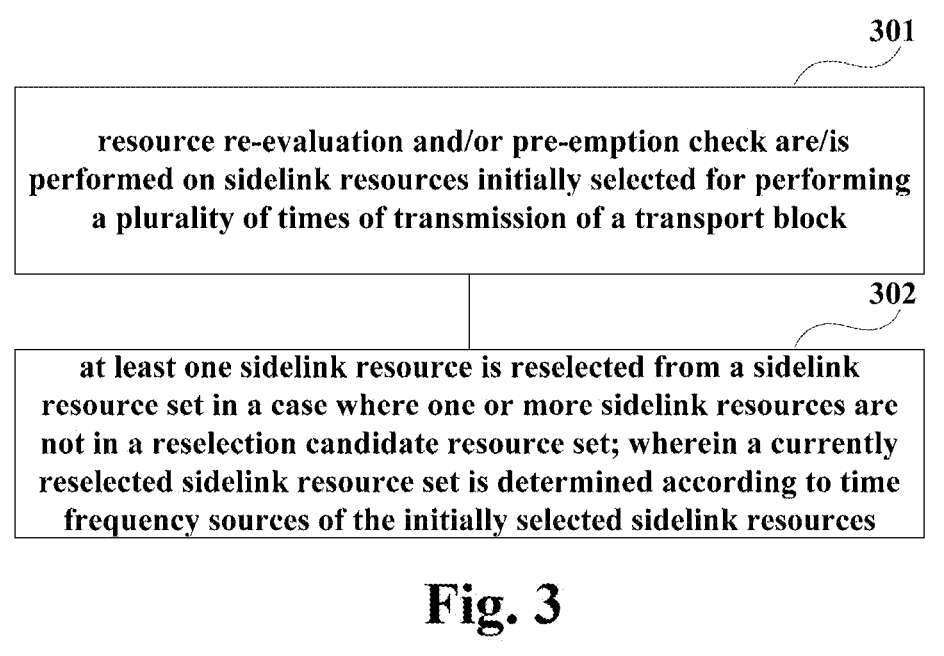

SIDELINK RESOURCE RESELECTION METHOD AND APPARATUS

CROSS-REFERENCE TO RELATED APPLICATION

This application is a continuation application of International Application PCT/CN2020/084044 filed on Apr. 9, 2020, and designated the U.S., the entire contents of which are incorporated herein by reference.

TECHNICAL FIELD

This disclosure relates to the field of communication technologies.

BACKGROUND

In vehicle-to-everything (V2X) communications in Rel-15 and previous versions, two modes of allocating sidelink resources are supported: mode 1 and mode 2. For mode 1, sidelink resources are obtained by allocating by a network device (e.g. a base stations); and for mode 2, a terminal equipment autonomously selects transmission resources, that is, transmission resources are obtained in a sensing or detection-resource selection process.

On the other hand, New Radio (NR) V2X is one of the current research projects of Rel-16 standardization. Compared with Long Term Evolution (LTE) V2X, NR V2X needs to support many new scenarios and new services (such as remote driving, autonomous driving, and fleet driving, etc.), which should meet higher technical indicators (high reliability, low latency, high data rate, etc.).

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY

It was found by the inventors that compared with LTE V2X, NR V2X needs to support more times of retransmission, that is, the number of times of retransmission may be greater than one, and the total number of times of transmission (initial transmission plus retransmission) may be greater than 2 (for example, a maximum number of times of transmission be configured to be 32). In addition, compared with LTE V2X, NR V2X needs to additionally support transmission and reception of aperiodic services, a case of resource reselection may occur. After sidelink resources are selected, for how to reselect sidelink resources in a candidate resource set of a selection window, there exists no solution at present.

In order to solve at least one of the above problems, embodiments of this disclosure provide a sidelink resource reselection method and apparatus.

According to one aspect of the embodiments of this disclosure, there is provided a sidelink resource reselection method, including:

performing resource re-evaluation and/or pre-emption check on sidelink resources initially selected for performing a plurality of times of transmission of a transport block; and reselecting at least one sidelink resource from a sidelink resource set in a case where one or more sidelink resources are not in a reselection candidate resource set; wherein a currently reselected sidelink resource set is determined according to time frequency sources of the initially selected sidelink resources.

According to another aspect of the embodiments of this disclosure, there is provided a sidelink resource reselection apparatus, including:

a processing unit configured to perform resource re-evaluation and/or pre-emption check on sidelink resources initially selected for performing a plurality of times of transmission of a transport block; and a reselecting unit configured to reselect at least one sidelink resource from a sidelink resource set in a case where one or more sidelink resources are not in a reselection candidate resource set; wherein a currently reselected sidelink resource set is determined according to time frequency sources of the initially selected sidelink resources.

An advantage of the embodiments of this disclosure exists in that in a case where one or more sidelink resources are not in a reselection candidate resource set, at least one sidelink resource is reselected from the sidelink resource set; wherein a currently reselected sidelink resource set is determined according to time frequency resources of the initially selected sidelink resources. Hence, not only more times of retransmission may be supported, but also reselection resources transmitted multiple times may be ensured to be indicated and reserved by sidelink control information.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

FIG. 3 is a schematic diagram of the sidelink resource reselection method of an embodiment of this disclosure;

DETAILED DESCRIPTION

Figure 1:
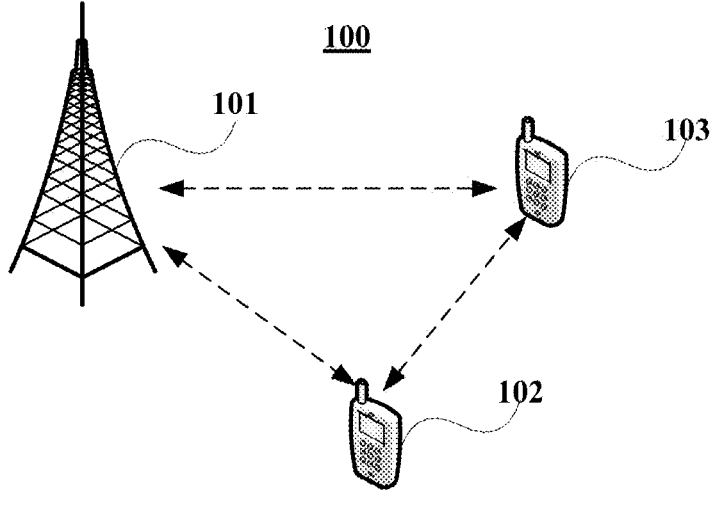
FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above. "Device" may refer to a network device, or may refer to a terminal equipment, unless otherwise specified.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, the communication system 100 may include a network device 101 and terminal equipments 102, 103. For the sake of simplicity, an example having only two terminal equipments and one network device is schematically given in FIG. 1; however, the embodiment of this disclosure is not limited thereto.

In the embodiment of this disclosure, existing services or services that may be implemented in the future may be performed between the network device 101 and the terminal equipments 102, 103. For example, such services may include but not limited to an enhanced mobile broadband (eMBB), massive machine type communication (MTC), and ultra-reliable and low-latency communication (URLLC), etc.

It should be noted that FIG. 1 shows that two terminal equipments 102, 103 are both within a coverage of the network device 101. However, this disclosure is not limited thereto, and the two terminal equipments 102, 103 may not be within the coverage of the network device 101, or one terminal equipment 102 is within the coverage of the network device 101 and the other terminal equipment 103 is outside the coverage of the network device 101.

In the embodiments of this disclosure, sidelink transmission may be performed between the two terminal equipments 102, 103. For example, the two terminal equipments 102, 103 may both perform sidelink transmission within the coverage of the network device 101 to implement V2X communications, or both of them may perform sidelink transmission outside the coverage of the network device 101 to implement V2X communications, and it may also be that one terminal equipment 102 is within the coverage of the network device 101 and another terminal equipment 103 is outside the coverage of the network device 101 and perform sidelink transmission to implement V2X communications.

In the embodiments of this disclosure, the terminal equipments 102 and/or 103 may autonomously select sidelink resources (i.e. in mode 2), in which case sidelink transmission may be independent of the network device 101, that is, the network device 101 is optional. Of course, autonomous selection of sidelink resources (i.e. in mode 2) and allocation of sidelink resources by the network device (i.e. in mode 1) may also combined in the embodiments of this disclosure; however, the embodiments of this disclosure is not limited thereto.

In LTE V2X, a terminal equipment is able to obtain sidelink transmission resources via a process of sensing detection+resource selection, in which sensing may be performed continuously to obtain resource occupancy condition in a resource pool. For example, the terminal equipment may estimate resource occupancy condition in a later period (referred to as a selection window) according to resource occupancy condition in a former period (referred to as a sensing window).

Figure 2:
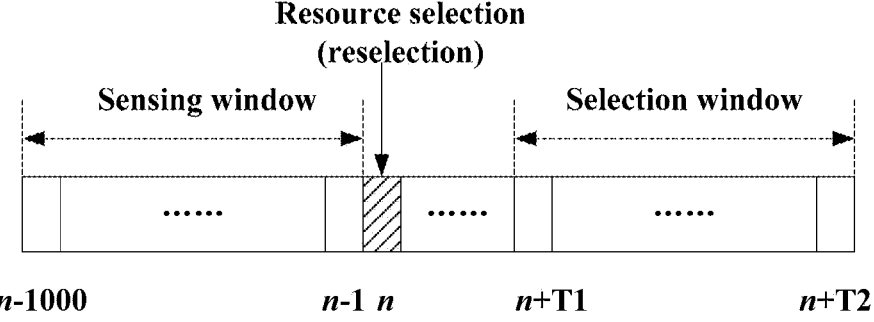
FIG. 2 is a schematic diagram of performing sidelink resource selection by a terminal equipment.

FIG. 2 is a schematic diagram of performing sidelink resource selection by a terminal equipment. As shown in FIG. 2, the terminal equipment may obtain resource occupancy condition of sensing windows via, for example, sidelink control information (SCI) in (n−1000)-th to (n−1)-th subframes or slots (i.e. the sensing windows) and detection of time frequency resource reference signals at different positions, and may consequently estimate resource occupancy condition of (n+T1)-th to (n+T2)-th subframes or slots (i.e. sensing windows).

For example, when there is sidelink data to be transmitted, a physical layer of the terminal equipment obtains a granularity $R_{x,y}$ of resource selection from a higher layer (such as a media access control (MAC) layer). The granularity may denote a series of continuous sub-channels in a subframe, each sub-channel including more than one continuous physical resource blocks (PRBs), the number of the PRBs being able to be determined by a resource pool, the resource pool being configured or pre-configured by a network device (such as a base station). A set of resources with sizes of $R_{x,y}$ (hereinafter referred to as $R_{x,y}$ candidate resources) in all subframes in an entire selection window is initially defined as set A.

The terminal equipment may exclude a part of candidate resources in set A according to a detection result within the sensing window before data to be transmitted arrive. For example, following $R_{x,y}$ candidate resources need to be excluded:

all $R_{x,y}$ candidate resources of the terminal equipment in subframes in the selection window that may possibly be performed resource reservation to which transmission subframes in the sensing window correspond;

an $R_{x,y}$ candidate resource in subframes detected by the terminal equipment in the sensing window, wherein it is detected on the $R_{x,y}$ candidate resource that SCI reserves subframes to which a current selection window corresponds, an indicated frequency-domain resource overlaps with the $R_{x,y}$ candidate resource in a frequency domain, and a detection result of reference signal receiving power (RSRP) of a physical sidelink shared channel (PSSCH) to which the SCI corresponds is greater than a threshold (hereinafter referred to as an RSRP threshold); or, the SCI reserves a subframe after the selection window, the subframe is the same subframe as a subframe in subsequent subframes possibly reserved by subframes in the current selection window in a time domain, a frequency-domain resource overlaps with the $R_{x,y}$ candidate resource in a frequency domain, and a detection result of RSRP of a PSSCH to which the SCI corresponds is greater than an RSRP threshold.

If the number of $R_{x,y}$ candidate resources remained in set A is less than 20% of an initial total number after the above resource exclusion, the RSRP threshold is incremented by 3 dB, and re-exclusion is performed in the initial set A, until the number of $R_{x,y}$ candidate resources remained in set A is greater than or equal to 20% of the initial total number.

The $R_{x,y}$ candidate resources in set A are placed in set B in an ascending order of S-RSSIs, until the number of $R_{x,y}$ candidate resources in set B is greater than or equal to 20% of the initial total number of the $R_{x,y}$ candidate resources in set A; wherein set B is a set that is blank initially, and S-RSSI denotes a linear average of signal strengths of all subchannels in the $R_{x,y}$ candidate resources.

Then, the physical layer of the terminal equipment may report set B to the MAC layer, and the MAC layer performs random selection in set B, selecting a candidate resource for data transmission. In addition, a modulation and coding scheme (MCS) is selected from the indicated resources for data transmission.

If the MAC layer is configured for retransmission before resource selection, after the MAC layer selects a resource, a resource is randomly selected from resources contained in a set of remaining available resources in a time-domain range that initial transmission SCI is able to indicate (such as [−15, 15] subframes), and an MCS is selected from the indicated resources for data retransmission. In two resources, one resource earlier in time is used to transmit initial transmission resources, and the resource later in time is used to transmit retransmission resources. If there exists no such available resource, current transmission does not support retransmission, that is, the number of times of transmission becomes 1.

It should be noted that the process of sensing detection+ resource selection in LTE V2X is only schematically illustrated above, and reference may be made to the contents in Section 14.1.1.6 in 3 GPP TS 36.213 V15.2.0 for specific contents of the above process. Compared with LTE V2X, NR V2X needs to support more times of retransmission, that is, the number of times retransmission may be greater than 1, and a total number of times of transmission is greater than 2 (a maximum number may be configured to be 32). In addition, in SCI to which each sidelink resource corresponds, at most three transmission resources can only be indicated.

Furthermore, compared with LTE V2X, NR V2X needs to additionally support transmission and reception of aperiodic services. For example, after selecting a transmission resource, a UE needs to continue to detect whether other UEs are to occupy selected resources for data transmission, or whether there exist overlapping resources in the time domain and frequency domain for data transmission (mainly for aperiodic services). As for how to perform resource reselection when such situations occur, there exists no relevant conclusion in existing schemes. Following embodiments of this disclosure propose corresponding solutions to one or more of the above problems.

In the embodiments of this disclosure, the sidelink is described by taking V2X as an example; however, this disclosure is not limited thereto, and it is also applicable to other sidelink transmission scenarios than V2X. In addition, sidelink control information (SCI) is carried by a PSCCH, sidelink data are carried by a PSSCH, and sidelink feedback information is carried by a physical sidelink feedback channel (PSFCH).

In the following description, the terms "sidelink" and "V2X" are interchangeable, the terms "PSFCH" and "sidelink feedback channel" are interchangeable, and the terms "PSCCH" and "sidelink control channel" or "sidelink control information" are interchangeable, and the terms "PSSCH" and "sidelink data channel" or "sidelink data" are interchangeable.

In addition, transmitting or receiving a PSSCH may be understood as transmitting or receiving sidelink data carried by a PSSCH; transmitting or receiving a PSFCH may be understood as transmitting or receiving sidelink feedback information carried by a PSFCH. At least one time of transmission may be understood as at least one time of transmission of a PSSCH/PSCCH or at least one time of transmission of sidelink data/information, and current transmission may be understood as current transmission of a PSSCH/PSCCH or current transmission of sidelink data/information.

In the embodiments of this disclosure, initial selection is relative to reselection, and shall not be understood as a specific time of selection. For example, a first time of selection may be referred to as initial selection, and a second time of selection may be referred to as reselection; an n-th time of selection may be referred to as initial selection, and an (n+1)-th time of selection may be referred to as reselection; and the embodiments of this disclosure are not limited thereto.

Embodiments of a First Aspect

The embodiments of this disclosure provide a sidelink resource reselection method, which shall be described from a terminal equipment. The terminal equipment (which may be referred to as a transmitting terminal equipment), as a transmitter of service data, transmits sidelink data to one or more other terminal equipments (which may be referred to as a receiving terminal equipment).

FIG. 3 is a schematic diagram of the sidelink resource reselection method of an embodiment of this disclosure. As shown in FIG. 3, the method includes:

301: resource re-evaluation and/or pre-emption check are/is performed on sidelink resources initially selected for performing a plurality of times of transmission of a transport block; and 302: at least one sidelink resource is reselected from a sidelink resource set in a case where one or more sidelink resources are not in a reselection candidate resource set; wherein a currently reselected sidelink resource set is determined according to time frequency sources of the initially selected sidelink resources.

It should be noted that FIG. 3 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 3.

Initially selected sidelink resources shall be schematically described below.

In the embodiments of this disclosure, a transmission block (TB) of a data packet to be transmitted may include one or more times of transmission, hence, one or more sidelink resources need to be selected. Foremost transmission in time in the one or more times of transmission is referred to as first time of transmission (referred to as initial transmission for short), and one or more times of retransmission may also be included.

In some embodiments, a data packet transmitted per physical layer contains a corresponding priority, such as a ProSe per-packet priority (PPPP); and furthermore, a channel congestion level may be characterized by a channel busy ratio (CBR). A selection range of the number of times of transmission may be determined according to the PPPP of the data packet to be transmitted and a CBR of a sidelink resource pool, and the terminal equipment may select from the selection range to determine the number of times of transmission of the transport block.

In some embodiments, the MAC layer of the terminal equipment sequentially selects at least one sidelink resource from the sidelink resource set according to the number of times of transmission. The sidelink resource set S is initially the above set B, and reference may be made to previous contents for how to obtain it. In addition, in the embodiments of this disclosure, the terminal equipment may randomly select one sidelink resource each time; however, this disclosure is not limited thereto, for example, multiple sidelink resources may be selected each time.

Initial selection of sidelink resources shall be described below by taking selection in a one by one manner as an example.

Figure 4:
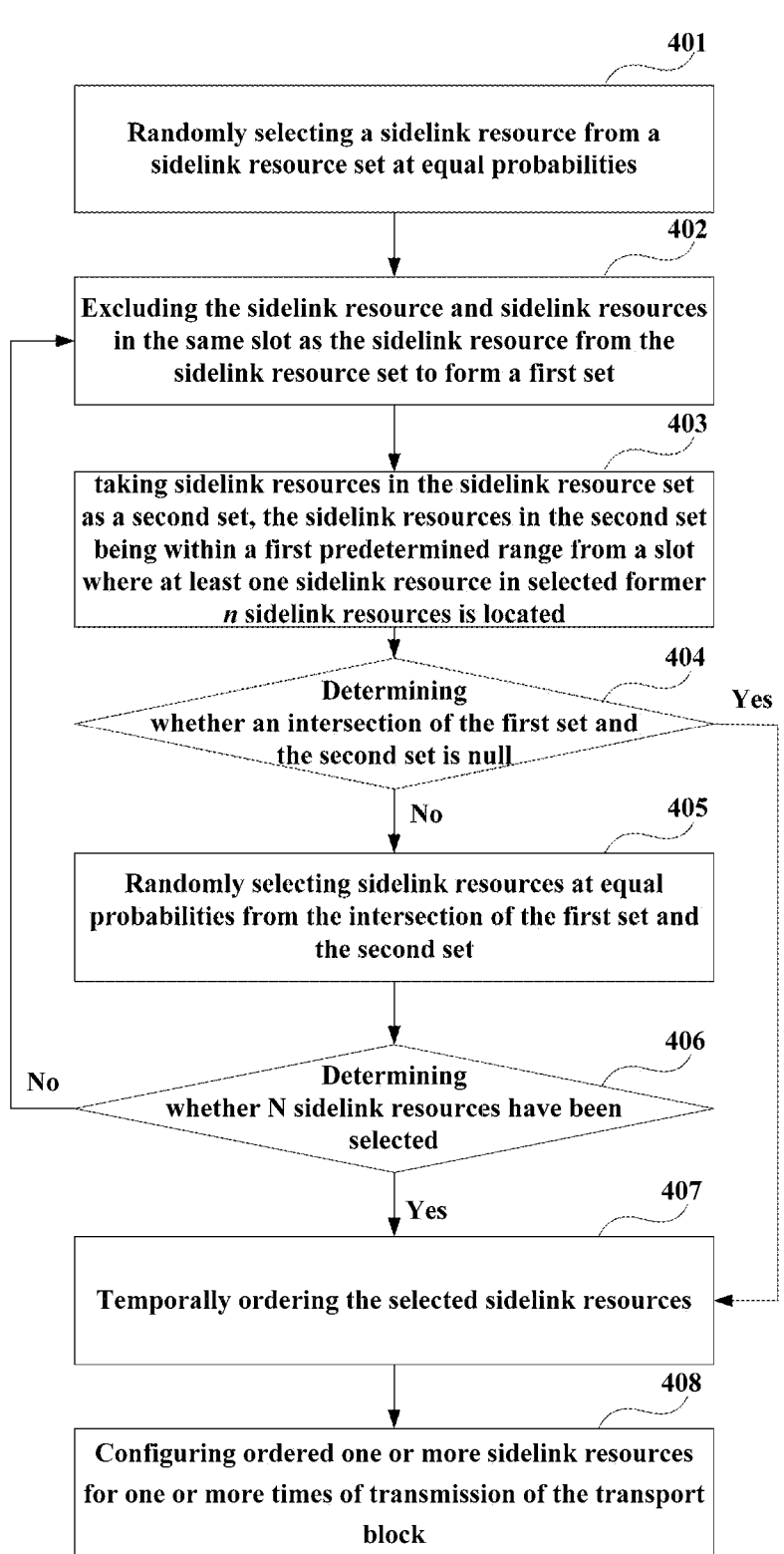
FIG. 4 is a schematic diagram of selecting sidelink resources in a one by one manner of the embodiment of this disclosure.

FIG. 4 is a schematic diagram of selecting sidelink resources in a one by one manner of the embodiment of this disclosure, showing a case where the number of times of transmission is at least 2. In the following description, n denotes a selection number, $1 \leq n \leq N-1$, and N is the number of times of transmission (also referred to as a target number of times of transmission). If the number of times of transmission is 1, following operation 401 may only be executed.

As shown in FIG. 4, the method includes:

401: randomly selecting a sidelink resource from a sidelink resource set at equal probabilities;

taking n=1 as an example, a first time frequency resource for transmission may be randomly selected from set B at equal probabilities, denoted as $R_1$; for the sake of convenience below, a sidelink resource selected at an n-th time is denoted as $R_n$;

402: excluding the sidelink resource and sidelink resources in the same slot as the sidelink resource from the sidelink resource set to form a first set;

after $R_n$ is selected, $R_n$ itself and all resources in the same slot as $R_n$ need to be excluded from the candidate resource set, and a resource set after the resource exclusion, i.e. the first set, is denoted as $S_n$ (a subset of S); taking n=1 as an example, the resource set after the resource exclusion is set to be $S_1$; and

403: taking sidelink resources in the sidelink resource set as a second set, the sidelink resources in the second set being within a first predetermined range from a slot where at least one sidelink resource in selected former n sidelink resources is located (which may be referred to as a current slot).

In some embodiments, the first predetermined range is [−K, K] slots, where, K is an integer greater than or equal to 0. For example, the first predetermined range is within 32 slots, which may be expressed as [−32, 32] slots (including the current slot itself) or [−31, 31] slots (excluding the current slot itself), that is, a time range of 31 slots before a starting point which is a sidelink resource of a compared object and 31 slots after the starting point is the first predetermined range. However, this disclosure is not limited thereto, and it may also be other ranges, such as within 16 slots, expressed as [−15, 15] slots (excluding the current slot itself) or [−16, 16] slots (including the current slot itself), or within 64 slots, expressed as [−63, 63] slots (excluding the current slot itself) or [−64, 64] slots (including the current slot itself), and so on.

For example, after an n-th time of resource selection is performed and $R_n$ is selected, total n resources of $\{R_1, R_2, \ldots R_n\}$ have been selected. Then, for each resource in all the selected resources $\{R_1, R_2, \ldots R_n\}$, it is deemed that resources within set B temporally spaced apart from the resource by [−K, K] slots are resources satisfying conditions, and for the selected resources $\{R_1, R_2, \ldots R_n\}$, a set of all candidate resources satisfying the conditions, i.e. the second set, is denoted by $S'_n$; however, this disclosure is not limited thereto, and one or more resources may be selected from $\{R_1, R_2, \ldots R_n\}$, and the second set is determined according to these resources.

As shown in FIG. 4, the method may further include:

404: determining whether an intersection of the first set and the second set is null, executing 407 if yes, and executing 405 if no;

in some embodiments, if $(S_n \cap S'_n)=\emptyset$ after a last time of resource selection, it is deemed that the resource selection process has ended, and a subsequent resource ordering process is performed on $N_1$ resources $\{R_1, R_2, \ldots R_{N1}\}$, where, $N_1<N$;

405: randomly selecting sidelink resources at equal probabilities from the intersection of the first set and the second set;

that is, an (n+1)-th resource $R_{n+1}$ is randomly selected at equal probabilities in the set $S_n \cap S'_n$;

406: determining whether N sidelink resources have been selected, executing 407 if selecting N sidelink resources, and executing 402 if not selecting N sidelink resources and continuing to perform sidelink resource selection sequentially;

in some embodiments, if the number of resources required by a target number N of times of transmission is reached in the resource selection process, the resource selection process ends, and a subsequent resource ordering process is performed on the selected $N_1$ resources $\{R_1, R_2, \ldots R_{N1}\}$, where, $N_1=N$;

407: temporally ordering the selected sidelink resources; and

408: configuring ordered one or more sidelink resources for one or more times of transmission of the transport block.

In some embodiments, a temporally foremost resource in the ordered sidelink resources is used for initial transmission of the transport block, and an (i+1)-th resource in time is used for an i-th time of retransmission; where, $1 \leq i \leq N_1 - 1$, $N_1$ being the number of the ordered sidelink resources.

FIG. 4 above schematically illustrates the initial selection of the sidelink resources, in which transmission to each selected resource (excluding a resource temporally transmitted first) corresponds should be indicated by SCI to which the previous transmission corresponds and reserved.

It should be noted that FIG. 4 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 4.

The initial selection of sidelink resources has been schematically described above; however, this disclosure is not limited thereto, and reference may be made to related technologies for the initially selected sidelink resources. Selection of sidelink resources after initial selection of the sidelink resources shall be schematically described below.

In the embodiments of this disclosure, after the initial selection of sidelink resources, the terminal equipment may perform resource re-evaluation and/or pre-emption check to determine whether to perform resource reselection on the selected resources.

Cases of resource re-evaluation shall be described below first, and for how to perform resource reselection during resource re-evaluation, reference may be made to the embodiments of the second and third aspects described later.

In some embodiments, resource re-evaluation is performed at a time point before an initially selected i-th sidelink resource, and it is determined that one or more sidelink resources of the sidelink control information are not in the reselection candidate resource set; where, i is an integer.

For example, at a certain time point in a period of time (defined as T3) before each SCI is transmitted, it is needed to re-evaluate resources reserved for this SCI (excluding current transmission at the same slot as a PSCCH where the SCI is located, these resources being resources reserved by the SCI for the first time) so as to determine whether the reserved resources are occupied by other UEs and the measured RSRP value is greater than the corresponding threshold after a period of time has elapsed.

After the resource re-evaluation, if a resource is occupied by other UEs and the measured RSRP value of the reference signal is greater than the corresponding threshold, the resource will not be included in a reselection candidate resource set reported after the resource re-evaluation process, and it is needed to reselect this resource.

Figure 5:
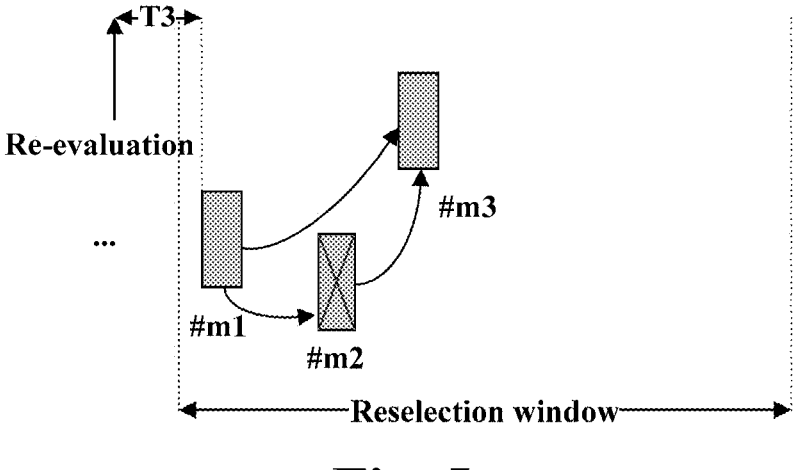
FIG. 5 is an exemplary diagram of resource re-evaluation of the embodiment of this disclosure.

FIG. 5 is an exemplary diagram of resource re-evaluation of the embodiment of this disclosure. As shown in FIG. 5, for example, #m1, #m2 and #m3 are sidelink resources in three times of transmission in multiple times of transmission of a TB, which are obtained in an initial selection process; and SCI to which #m1 corresponds indicates and reserves #m2 and #m3.

As shown in FIG. 5, at a time point before #m1 spaced apart therefrom by T3, #m2 and #m3 need to be re-evaluated. If there exists a resource (such as #m2) that is not in the reselection candidate set after the resource re-evaluation, resource reselection for #m2 is triggered.

A case of pre-emption check shall be described below, and for how to perform resource reselection during pre-emption evaluation, reference may be made to the embodiments of the fourth and fifth aspects described later.

In some embodiments, pre-emption check is performed on an initially selected j-th sidelink resource and subsequent sidelink resources, and it is determined that one or more sidelink resources of the sidelink control information are not in the reselection candidate resource set; where, j is an integer.

For example, for a resource that has been indicated and reserved by the SCI, if it is detected that other UEs preempt the resource, the resource reselection process may be triggered at a time point before transmission to which the resource corresponds.

Figure 6:
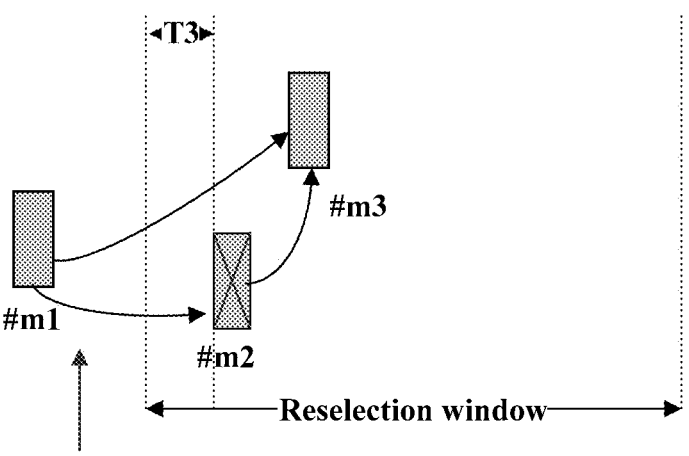
FIG. 6 is an exemplary diagram of pre-emption check of the embodiment of this disclosure.

FIG. 6 is an exemplary diagram of pre-emption check of the embodiment of this disclosure. As shown in FIG. 6, for example, #m1, #m2 and #m3 are sidelink resources in three times of transmission in multiple times of transmission of a TB, which are obtained in an initial selection process; and #m1 indicates and reserves #m2 and #m3. At a time point after transmission of #m1 and before transmission of #m2, if the UE finds that resource #m2 is preempted, it may trigger resource reselection for #m2 at or before a time point spaced apart from #m2 by T3.

In the embodiments of this disclosure, for a temporally foremost first resource after the initial selection, the reselection may be included in the resource re-evaluation, or may be included in the pre-emption check. If it is found via the resource re-evaluation that its resources overlap with resources reserved by other UEs before it is transmitted, resource reselection may be performed with reference to the pre-emption check processing in the embodiments of the fourth and fifth aspects described later; for example, the resource reselection process may be performed on all selected resources, or may be performed only on the first resource based on time frequency positions of subsequent resources.

In some embodiments, a time interval between the reselected sidelink resources and a slot where a physical sidelink control channel (PSCCH) of the sidelink control information is located is greater than or equal to a predetermined value (T3).

For example, in the resource re-evaluation process, the reselected resource and the slot where the PSCCH to which the SCI for re-evaluation corresponds are spaced apart by a distance of at least T3, i.e. a next slot contained in the resource pool after a slot n+T3 that may be temporally selected, n being the slot where the PSCCH is located.

In some embodiments, for a reselected sidelink resource that is enabled for retransmission based on hybrid automatic repeat request (HARQ) feedback, if the resource is fed back together with any selected resource by a physical sidelink feedback channel (PSFCH) in the same slot or is in a period of time when a physical sidelink feedback channel to which any selected resource corresponds performs decoding, retransmission of the reselected sidelink resource based on hybrid automatic repeat request (HARQ) feedback is disabled, or retransmission of all reselected sidelink resources based on hybrid automatic repeat request (HARQ) feedback is disabled.

For example, after resource reselection is triggered by resource re-evaluation or pre-emption check, if reselected resource is an HARQ-ACK-enabled transmission resource and the following time constraint is not satisfied that: it is not fed back together with any selected resource by a PSFCH resource in the same slot, then HARQ-ACK disable is indicated in SCI to which a currently reselected resource corresponds or, HARQ-ACK disable is indicated in SCI to which all reselected resources of this time correspond. For transmission indicating the HARQ-ACK disable, the receiving UE does not feed back on the PSFCH.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that in a case where one or more sidelink resources are not in a reselection candidate resource set, at least one sidelink resource is reselected from the sidelink resource set; wherein a currently reselected sidelink resource set is determined according to time frequency resources of the initially selected sidelink resources. Hence, not only more times of retransmission may be supported, but also reselection resources transmitted multiple times may be ensured to be indicated and reserved by sidelink control information.

Embodiments of a Second Aspect

In the embodiments of this disclosure, resource reselection is performed on one or more sidelink resources that are not in the reselection candidate resource set. A resource collision or conflict refers to, for example, a situation where the UE detects that resources to be used for a time of transmission overlap with resources reserved by other UEs and a detection result of RSRP of a corresponding reference signal is greater than a threshold, or a situation where the UE detects that resources to be used for a time of transmission are completely identical to resources reserved by other UEs; and the resources here are initially selected resources.

In the embodiments of this disclosure, in the resource re-evaluation process, if it is found that resource collisions occur in resources reserved by corresponding SCI, an attempt may be made to reselect the collided resources only without changing remaining transmitted resources (that is, the initially selected resources are reserved).

For example, as shown in FIG. 5, if m2 is not in the reselection candidate set, a sidelink resource is reselected; and if both m2 and m3 are not in the reselection candidate set, two sidelink resources are reselected. And other initially selected sidelink resources are still reserved.

In some embodiments, a maximum number $N_{max}$ of resources that the sidelink control information is able to indicate is 2 or 3, and in a case where a sidelink resource that is not in the reselection candidate resource set is an (i+1)-th or (i+2)-th resource, reselection is performed on the (i+1)-th or (i+2)-th sidelink resource;

wherein based on time frequency resources of the i-th sidelink resource and the (i+2)-th to $N_1$-th sidelink resources, a sidelink resource is reselected from the sidelink resource set; where, $1 \le i \le N_1 - 2$, $N_1$ being the number of the multiple initially selected sidelink resources.

In some embodiments, if a time interval between the i-th sidelink resource and the (i+2)-th sidelink resource is within a predetermined range, a reselected sidelink resource satisfies the following conditions that:

a time interval between the reselected sidelink resource and at least one of the i-th sidelink resource, the (i+2)-th to the $N_1$-th sidelink resources is within the predetermined range; and the reselected sidelink resource is not in the same slot as any one of the i-th sidelink resource, the (i+2)-th to the $N_1$-th sidelink resources.

The reselected sidelink resource also satisfies the following conditions: it is not fed back together with any one of the first to the $N_1$-th sidelink resources by the physical sidelink feedback channel (PSFCH) of the same slot, and the slot where it is located is not within a period of time (which may be a predetermined or defined time, that is, a processing time) after the slot where the PSFCH corresponding to any one of the resources is located.

Alternatively, the reselected sidelink resource further satisfies the following condition that: it is after a sidelink resource in the same slot as the physical sidelink control channel (PSCCH) of the sidelink control information.

Figure 7:
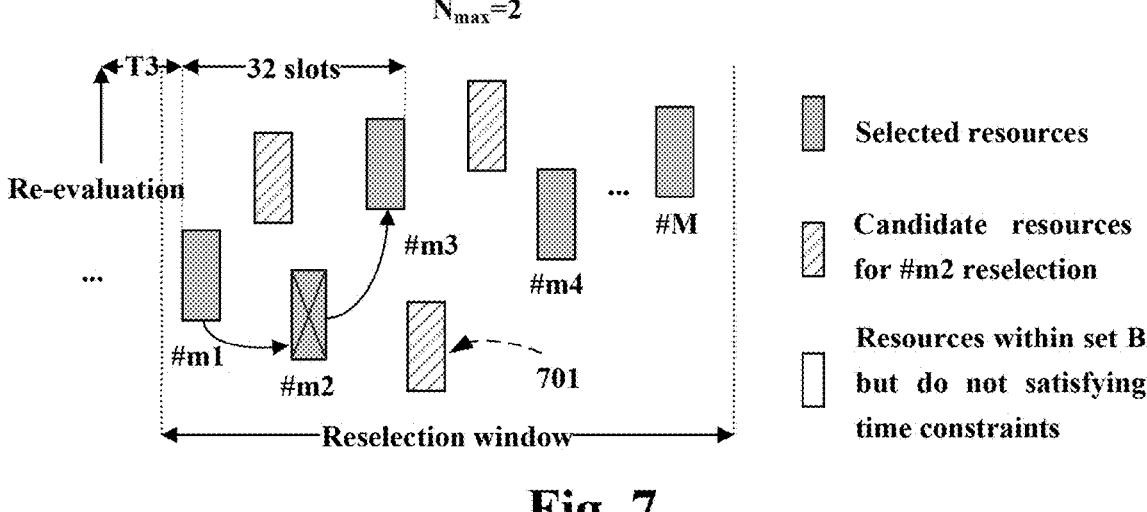
FIG. 7 is an exemplary diagram of sidelink resource reselection in resource re-evaluation of the embodiment of this disclosure.

FIG. 7 is an exemplary diagram of sidelink resource reselection in resource re-evaluation of the embodiment of this disclosure. For example, M sidelink resources are initially selected. It is assumed that $N_{max}=2$ and a conflict is found in #m2 during a resource re-evaluation process starting at a time point before #m1 spaced apart therefrom by T3.

As shown in FIG. 7, if resources #m1 and #m3 are within 32 slots, even if resource #m2 does not exist, a chain of resource indications will not be interrupted, in which case resource #m2 may be reselected according to resources #m1, #m3, . . . #M.

In the resource reselection process, the selected resources #m1, #m3, . . . #M may be reserved, and then another sidelink resource is selected from a candidate set satisfying the above time constraints (such as candidate resources for reselection of #m2 shown in FIG. 7) based on their time frequency positions.

For example, as shown in FIG. 7, a resource 701 may be selected, and then resources #m1, #m3, . . . #M and resource 701 are sequentially used for a number of times of transmission after the reselection.

In some embodiments, if a time interval between the i-th sidelink resource and the (i+2)-th sidelink resource is not within a predetermined range, a reselected sidelink resource satisfies the following conditions that:

a time interval between the reselected sidelink resource and at least one of the i-th sidelink resource, the (i+2)-th sidelink resource to the $N_1$-th sidelink resource is within the predetermined range; and the reselected sidelink resource is not in the same slot as any one of the i-th sidelink resource and the (i+2)-th sidelink resource to the $N_1$-th sidelink resource; and time intervals between the reselected sidelink resource and the i-th sidelink resource and the (i+2)-th sidelink resource are within the predetermined range, and the reselected sidelink resource is temporally after the i-th sidelink resource and before the (i+2)-th sidelink resource.

The reselected sidelink resources also satisfies the following conditions that: the reselected sidelink resource and any one of a first to the $N_1$-th sidelink resources are not fed back together by physical sidelink feedback channels (PSFCHs) of a same slot, and the slot is not within a period of time (i.e. the processing time) after a slot where a physical sidelink feedback channel to which any one of the resources corresponds is at.

Alternatively, the reselected sidelink resource further satisfies the following condition that: it is after a sidelink resource in the same slot as the physical sidelink control channel (PSCCH) of the sidelink control information.

Figure 8:
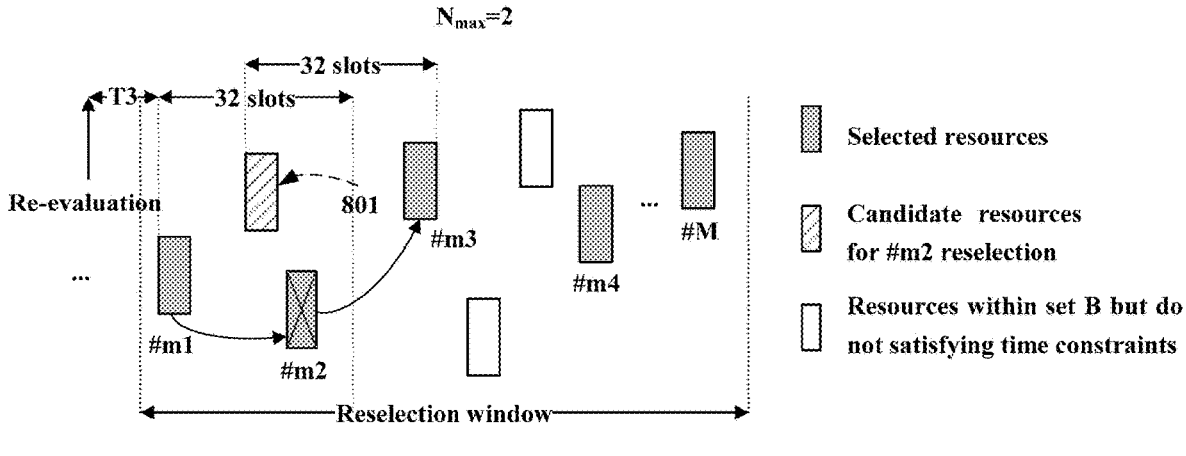
FIG. 8 is another exemplary diagram of sidelink resource reselection in resource re-evaluation of the embodiment of this disclosure.

FIG. 8 is another exemplary diagram of sidelink resource reselection in resource re-evaluation of the embodiment of this disclosure. For example, M sidelink resources are initially selected. It is assumed that $N_{max}=2$ and a conflict is found in #m2 during a resource re-evaluation process starting at a time point before #m1 spaced apart therefrom by T3.

As shown in FIG. 8, if resources #m1 and #m3 are not within 32 slots, resource #m2 does not exist, and a chain of resource indications will be interrupted, in which case resource #m2 may be reselected according to resources #m1, #m3, . . . #M.

In the resource reselection process, the selected resources #m1, #m3, . . . #M may be reserved, and then another sidelink resource is selected from a candidate set satisfying the above time constraints (such as candidate resources for reselection of #m2 shown in FIG. 7) based on their time frequency positions. In comparison with FIG. 7, the selected resource should be within 32 slots simultaneously with resources #m1 and #m3, and is temporally after resource #m1 and before resource #m3.

For example, as shown in FIG. 8, a resource 801 may be selected, and then resources #m1, #m3, . . . #M and resource 801 are sequentially used for a number of times of transmission after the reselection.

In some embodiments, in a case where the maximum number $N_{max}$ of resources that the sidelink control information is able to indicate is 2 or 3 and the sidelink resource not in the reselection candidate resource set is the $N_1$-th sidelink resource, the reselected sidelink resource satisfies the following conditions that:

a time interval between the reselected sidelink resource and at least one of the i-th sidelink resource to the $N_1-1$-th sidelink resource is within the predetermined range, and the reselected sidelink resource is not at the same slot as any one of the i-th sidelink resource to the $N_1-1$-th sidelink resource.

And the reselected sidelink resource further satisfies the following conditions that: the reselected sidelink resource and any one of a first to the $N_1$-th sidelink resources are not fed back together by physical sidelink feedback channels (PSFCHs) of a same slot, and the slot is not within a period of time (i.e. the processing time) after a slot where a physical sidelink feedback channel to which any one of the resources corresponds is at.

Alternatively, the reselected sidelink resource further satisfies the following conditions that: the reselected sidelink resource is after a sidelink resource in the same slot as the physical sidelink control channel (PSCCH) of the sidelink control information.

FIGS. 7 and 8 illustrate the case where $N_{max}=2$. For $N_{max}=3$, during the resource re-evaluation process starting at a time point before #m1 spaced apart therefrom by T3, it may possibly be found that a conflict occurs in one of resources #m2 and #m3, and reference may still be made to the case where $N_{max}=2$.

For example, if resources #m1 and #m4 are within 32 slots, the chain of resource indications will not be interrupted even if there exist no resources #m2 and #m3. If resource #m2 collides but resource #m3 does not collide, resource #m2 may be reselected according to resources #m1, #m3, #m4, . . . #M; if resource #m3 collides but resource #m2 does not collide, resource #m3 may be reselected according to resources #m1, #m2, #m4, . . . #M. One more resource may be selected from the candidate resources satisfying the time constraints based on their time frequency positions, and reference may be made to the example in FIG. 7.

For another example, if resources #m1 and #m4 are not within 32 slots, if one of resources #m2 or #m3 collides, the scheme of $N_{max}=2$ may be reused, such as making reference to the example in FIG. 8, which shall not be described herein any further.

In some embodiments, in a case where the maximum number $N_{max}$ of resources that may be indicated in the sidelink control information is 3 and the sidelink resources that are not in the reselection candidate resource set are the (i+1)-th and (i+2)-th sidelink resources, reselection is performed on the (i+1)-th and (i+2)-th sidelink resources;

wherein based on time frequency resources of the i-th sidelink resource and an (i+3)-th to the $N_1$ sidelink resources, two sidelink resources are reselected from the sidelink resource set; where, $1 \leq i \leq N_1-3$, and $N_1$ is the number of the multiple initially selected sidelink resources.

Figure 9:
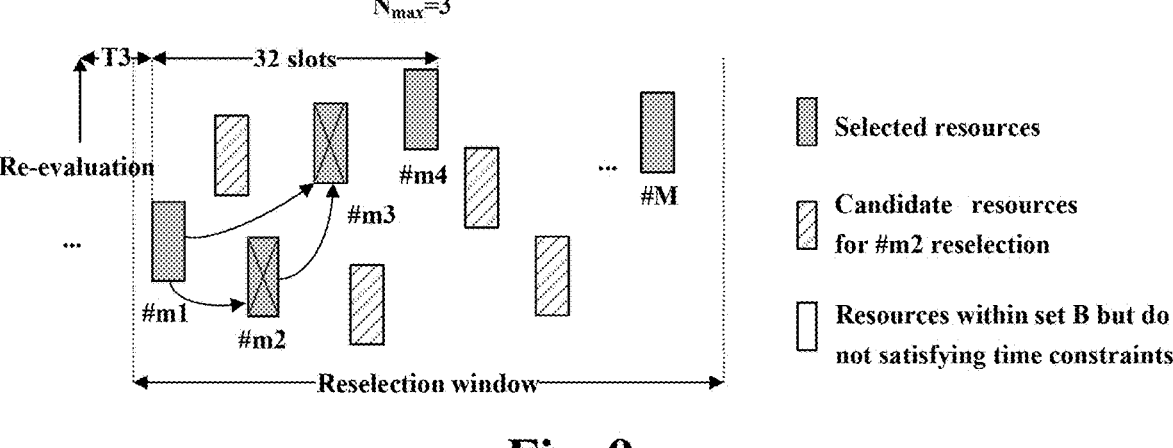
FIG. 9 is a further exemplary diagram of sidelink resource reselection in resource re-evaluation of the embodiment of this disclosure.

FIG. 9 is a further exemplary diagram of sidelink resource reselection in resource re-evaluation of the embodiment of this disclosure. For example, M sidelink resources are initially selected. It is assumed that $N_{max}=3$ and conflicts are found in resources #m2 and #m3 during a resource re-evaluation process starting at a time point before #m1 spaced apart therefrom by T3.

As shown in FIG. 9, if resources #m1 and #m4 are within 32 slots, even if resources #m2 and #m3 do not exist, a chain of resource indications will not be interrupted. If both resources #m2 and #m3 collide, resources #m2 and #m3 may be reselected according to resources m1, #m4, . . . #M. And two more resources may be selected from the candidate resources satisfying the time constraints based on their time frequency positions.

In some embodiments, in a case where a time interval between the i-th sidelink resource and the (i+3)-th sidelink resource is not within the predetermined range, the first sidelink resource of the two reselected sidelink resources satisfies the following conditions that:

a time interval between the first sidelink resource and at least one of the i-th sidelink resource and the (i+3)-th sidelink resource to the $N_1$-th sidelink resource is within the predetermined range, and the first sidelink resource is not at the same slot as any one of the i-th sidelink resource and the (i+3)-th sidelink resource to the $N_1$-th sidelink resource; and a time interval between the first sidelink resource and the i-th sidelink resource or the (i+3)-th sidelink resource is within the predetermined range, and the first sidelink resource is temporally after the i-th sidelink resource and before the (i+3)-th sidelink resource.

The second sidelink resource of the two reselected sidelink resources satisfies the following conditions that:

in a case where a time interval between the first sidelink resource and the i-th sidelink resource is within the predetermined range, time intervals between the second sidelink resource and the first sidelink resource and the (i+3)-th sidelink resource are all within the predetermined range, and the second sidelink resource is temporally after the i-th sidelink resource and before the (i+3)-th sidelink resource; and in a case where a time interval between the first sidelink resource and the (i+3)-th sidelink resource is within the predetermined range, time intervals between the second sidelink resource and the first sidelink resource and the i-th sidelink resource are all within the predetermined range, and the second sidelink resource is temporally after the i-th sidelink resource and before the (i+3)-th sidelink resource.

The two reselected sidelink resources satisfy the following conditions that: the two reselected sidelink resources and any one of the first to the $N_1$-th sidelink resources are not fed back together by the physical sidelink feedback channels (PFSCHs) of a same slot, and the slot is not within a period of time (i.e. the processing time) after the slot where the physical sidelink feedback channel to which any one of the resources corresponds is at.

Figure 10:
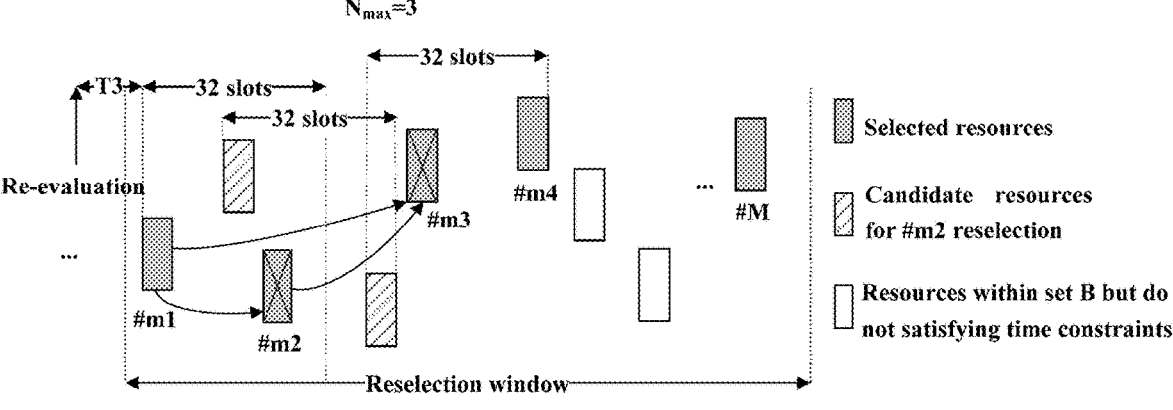
FIG. 10 is still another exemplary diagram of sidelink resource reselection in resource re-evaluation of the embodiment of this disclosure.

FIG. 10 is still another exemplary diagram of sidelink resource reselection in resource re-evaluation of the embodiment of this disclosure. For example, M sidelink resources are initially selected. It is assumed that $N_{max}=3$ and conflicts are found in resources #m2 and #m3 during a resource re-evaluation process starting at a time point before #m1 spaced apart therefrom by T3.

As shown in FIG. 10, for example, if resources #m1 and #m4 are not within 32 slots, after collisions occur in both resource #m2 and resource #m3, the chain of resource indications will be interrupted. Resource #m2 may be reselected according to resources #m1, #m4, . . . #M, but additional time constraints are required in comparison with the case in FIG. 9, that is, the first reselected resource should be within 32 slots together with resource #m1, or should be within 32 slots together with resource #m4, and temporally after resource #m1 and before resource #m4.

Furthermore, if the first resource and resource #m1 are within 32 slots, the second resource and resource #m4 should be within 32 slots, and should be within 32 slots together with the first resource, and temporally after resource #m1 and before resource #m4; and if the first resource and resource #m4 are within 32 slots, the second resource and resource #m1 should be within 32 slots, and should be within 32 slots together with the first resource, and temporally after resource #m1 and before resource #m4.

In some embodiments, in a case where the maximum number $N_{max}$ of resources that the sidelink control information is able to indicate is 3 and the sidelink resources not in the reselection candidate resource set are the $(N_1-1)$-th and $N_1$-th sidelink resources, the first sidelink resource of the two reselected sidelink resources satisfies the following conditions that: a time interval between the first sidelink resource and at least one of the i-th sidelink resource to an $(N_1-2)$-th sidelink resource is within the predetermined range, and the first sidelink resource is not at the same slot as any one of the i-th sidelink resource to the $(N_1-2)$-th sidelink resource;

the second sidelink resource of the two reselected sidelink resources satisfies the following conditions that: a time interval between the second sidelink resource and at least one of the i-th sidelink resource to the $(N_1-2)$-th sidelink resource and the first sidelink resource is within the predetermined range, and the second sidelink resource is not at the same slot as any one of the i-th sidelink resource to the $(N_1-2)$-th sidelink resource and the first sidelink resource.

The two reselected sidelink resources satisfy the following conditions that: the two reselected sidelink resources and any one of the first to the $N_1$-th sidelink resources are not fed back together by the physical sidelink feedback channels of a same slot, and the slot is not within a period of time (i.e. the processing time) after the slot where the physical sidelink feedback channel to which any one of the resources corresponds is at.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that in a case where one or more sidelink resources are not in a reselection candidate resource set, at least one sidelink resource is reselected from the sidelink resource set; wherein a currently reselected sidelink resource set is determined according to time frequency resources of the initially selected sidelink resources. Hence, not only more times of retransmission may be supported, but also reselection resources transmitted multiple times may be ensured to be indicated and reserved by sidelink control information.

Embodiments of a Third Aspect

In the embodiments of this disclosure, resource reselection is performed in a one by one manner on one or more sidelink resources that are not in the reselection candidate resource set and subsequent sidelink resources. During a resource re-evaluation process, if it is found that resource collisions occur in resources reserved by corresponding SCI, resource reselection may be performed on the collided resources and all subsequent resources, with contents identical to those in the embodiments of the second aspect being not going to be described herein any further.

The embodiments of the third aspect may be implemented separately, or may be implemented in combination with the embodiments of the second aspect. For example, the embodiments of the second aspect may be executed first, and then the embodiments of the third aspect are executed, that is, resource reselection is preferentially performed on the collided resources, and if there exists no available resource, resource reselection is performed on all subsequent resources to satisfy time constraints.

In some embodiments, a sidelink resource in the same slot as a physical sidelink control channel (PSCCH) of sidelink control information is taken as a sidelink resource selected for the first time in the resource reselection.

Figure 11:
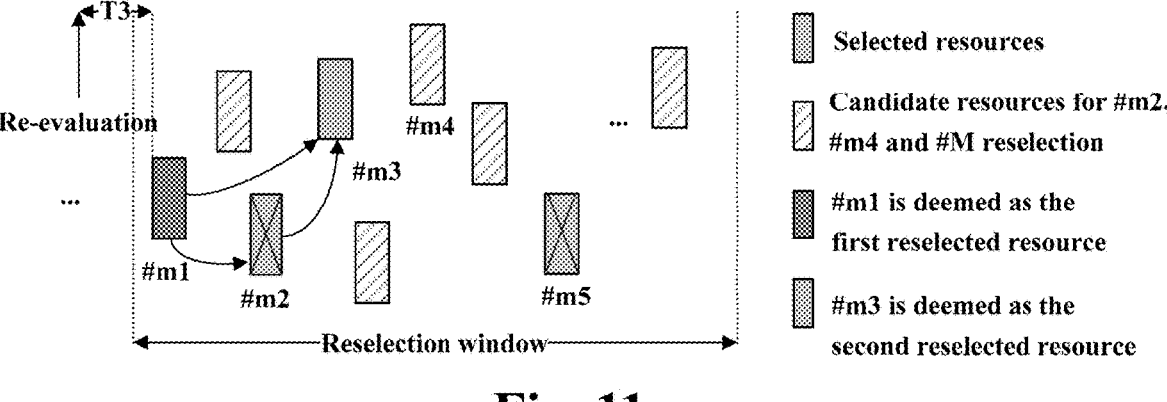
FIG. 11 is yet another exemplary diagram of sidelink resource reselection in resource re-evaluation of the embodiment of this disclosure.

FIG. 11 is yet another exemplary diagram of sidelink resource reselection in resource re-evaluation of the embodiment of this disclosure. For example, as shown in FIG. 11, M sidelink resources are initially selected. At a time point before resource #m1 space apart therefrom by T3, resources #m2 and #m3 reserved by SCI of resource #m1 are re-evaluated, and if it is detected that a collision occurs in resource #m2, a resource reselection process is triggered.

As shown in FIG. 11, it may be deemed that resource #m1 is a first reselected resource in the resource reselection process, and then resource reselection is performed on resources #m2, #m3 . . . #M, that is, a target number of reselection is (M-m1) resources, and resource reselection is performed under a condition that the time constraints are satisfied.

In some embodiments, if the sidelink control information further reserves another sidelink resource, resource reselec-tion is not performed on the another sidelink resource, and the another sidelink resource is taken as a sidelink resource selected for the second time in the resource reselection.

As shown in FIG. 11, alternatively, as resource collision does not occur in resource #m3, it may be deemed that resource #m1 and resource #m3 are the first and second reselected resources in the resource reselection process, and resource reselection is performed on resources #m2, #m4 . . . #M, that is, the target number of reselection is (M-m1−1) resources.

In some embodiments, when the sidelink control information further reserves another sidelink resource, no reselection is performed for the another sidelink resource, and the another sidelink resource is taken as a sidelink resource selected for the first time in the resource reselection.

For example, it may be deemed that resource #m3 is the sidelink resource selected for the first time in the resource reselection process, and then resource reselection is performed on resources #m1, #m2, #m4 . . . #M, that is, a target number of reselection is (M-m1) resources, and resource reselection is performed under a condition that the time constraints are satisfied.

In some embodiments, a sidelink resource in the same slot as the physical sidelink control channel (PSCCH) of the sidelink control information is taken as the sidelink resource selected for the second time in the resource reselection.

For example, it may be deemed that resource #m3 and resource #m1 are the first and second reselected resources in the resource reselection process, and then resource reselec-tion is performed on resources #m2, #m4 . . . #M, that is, a target number of reselection is (M-m1−1) resources.

In some embodiments, that resource reselection is performed one by one on one or more sidelink resources that are not in the reselection candidate resource set and subsequent sidelink resources includes:

selecting an (n+1)-th sidelink resource in a case where the number of the reselected resources is n; where, $1 \leq n \leq N-1$, N being the number of a sidelink resource at the same slot as the sidelink control information and subsequent resources in the multiple initially selected sidelink resources selected in an initial selection process.

For example, former n sidelink resources and sidelink resources at the same slot as the n-th sidelink resource are excluded from the sidelink resource set to form a first set, sidelink resources in the sidelink resource set having a time interval between them and at least one sidelink resource in the selected former n sidelink resources within a predetermined range are taken as a second set, and the (n+1)-th sidelink resource is randomly selected with equal probability from an intersection of the first set and the second set.

In some embodiments, in a case where retransmission based on hybrid automatic repeat request (HARQ) feedback is enabled, the n-th sidelink resource, sidelink resources in the same slot as the n-th sidelink resource, sidelink resources at the same slot as a physical sidelink feedback channel (PSFCH) to which the n-th sidelink resource corresponds and sidelink resources within a period of time after the physical sidelink feedback channel are excluded from the sidelink resource set to form the first set.

In some embodiments, in a case where N sidelink resources have been selected, or in a case where an intersection of the first set and the second set is null, the selected sidelink resources are ordered temporally.

For how to perform resource selection sequentially, reference may be made to FIG. 4 and related technologies.

The resource reselection process may be performed in a new candidate resource set (which may be referred to as a reselection candidate resource set) reported after the resource re-evaluation. For a resource where collision occurs, its resource after reselection is different from that before reselection; for a resource where no collision occurs, the resource after reselection may be identical to the resource before reselection, or may be different from the resource before reselection. After the resource reselection, if the required number of resources are unable to be reselected within the above time constraints, transmission of the current TB may not be able to reach the target number of times of transmission, that is, the number of resources after reselection may possibly be less than the number M of the initial selected resources.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that in a case where one or more sidelink resources are not in a reselection candidate resource set, at least one sidelink resource is reselected from the sidelink resource set; wherein a currently reselected sidelink resource set is determined according to time frequency resources of the initially selected sidelink resources. Hence, not only more times of retransmission may be supported, but also reselection resources transmitted multiple times may be ensured to be indicated and reserved by sidelink control information.

Embodiments of a Fourth Aspect

In the embodiments of this disclosure, no resource reselection is performed on one or more sidelink resources that are not in a reselection candidate resource set. Resource collision or conflict refers to, for example, a situation in which a UE detects that a resource to be used for a time of transmission is preempted by other UEs.

In the embodiments of this disclosure, in a pre-emption check process, if it is found that resource collisions occur in resources indicated and reserved by corresponding SCI, an attempt may be made to only reselect resources where collisions occur, without changing the remaining transmission resources.

For example, as shown in FIG. 6, if #m2 is preempted and is not in the reselection candidate set, a sidelink resource is reselected; and if both #m2 and #m3 are not in the reselection candidate set, two sidelink resources are reselected. The other initially selected sidelink resources are still reserved.

In some embodiments, in a case where a maximum number $N_{max}$ of resources that the sidelink control information is able to indicate is 2 or 3 and a sidelink resource not in the reselection candidate resource set is a j-th sidelink resource, reselection is performed on the j-th sidelink resource;

wherein a sidelink resource is reselected from the sidelink resource set based on time frequency resources of a (j+1)-th sidelink resource to the $N_1$-th sidelink resource; where, $1 \leq j \leq N_1-1$, $N_1$ being the number of the multiple initially selected sidelink resources.

In some embodiments, a reselected sidelink resource satisfies the following condition that: a time interval between the reselected sidelink resource and at least one of the (j+1)-th sidelink resource to the $N_1$-th sidelink resource is within the predetermined range, and the reselected sidelink resource is not at the same slot as any one of the (j+1)-th sidelink resource to the $N_1$-th sidelink resource.

And the reselected sidelink resource further satisfies the following conditions that: the reselected sidelink resource and any one of a first to the $N_1$-th sidelink resources are not fed back together by physical sidelink feedback channels (PSFCHs) of a same slot, and the slot is not within a period of time (i.e. the processing time) after a slot where a physical sidelink feedback channel to which any one of the resources corresponds is at.

Figure 12:
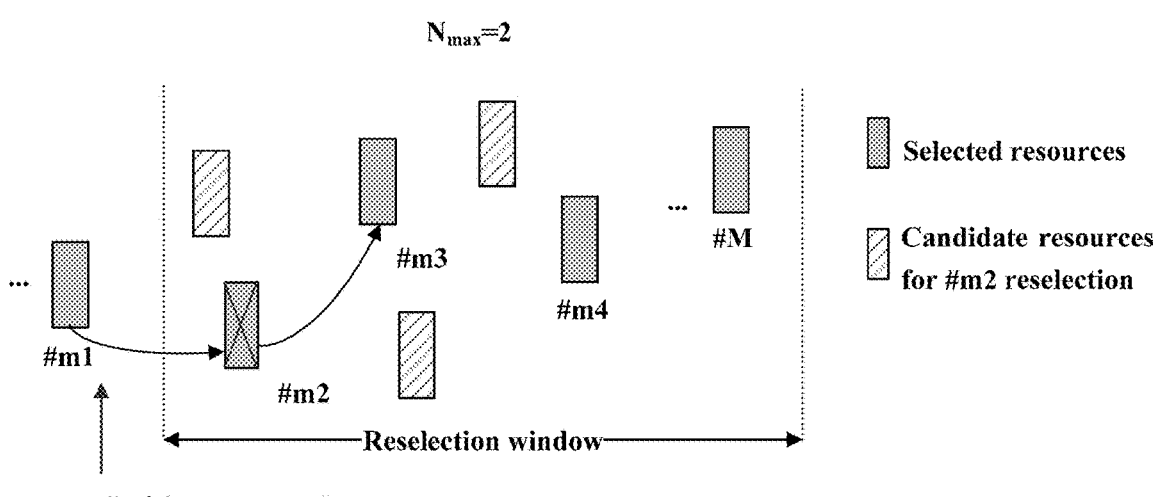
FIG. 12 is an exemplary diagram of sidelink resource reselection in pre-emption check of the embodiment of this disclosure.

FIG. 12 is an exemplary diagram of sidelink resource reselection in pre-emption check of the embodiment of this disclosure. For example, M sidelink resources are initially selected. It is assumed that $N_{max}=2$ and pre-emption check is started at a time point before resource #m2 indicated and reserved by the SCI of resource #m1, it is found that a conflict occurs in resource #m2.

As shown in FIG. 12, reselection may be performed on resource #m2 according to resources after resource #m2, i.e. resources #m3, . . . #M. That is, in the resource selection process, the selected resources #m3, . . . #M in the initial selection are reserved, and based on their time frequency positions, another resource is selected from the candidate resources satisfying the time constraints.

In some embodiments, the maximum number $N_{max}$ of resources that the sidelink control information is able to indicate is 3, and the reselected sidelink resource further satisfies the following conditions that: the reselected sidelink resource is after another sidelink resource indicated by the same sidelink control information, and the another sidelink resource is within the reselection candidate resource set and after a slot of the sidelink control information.

Figure 13:
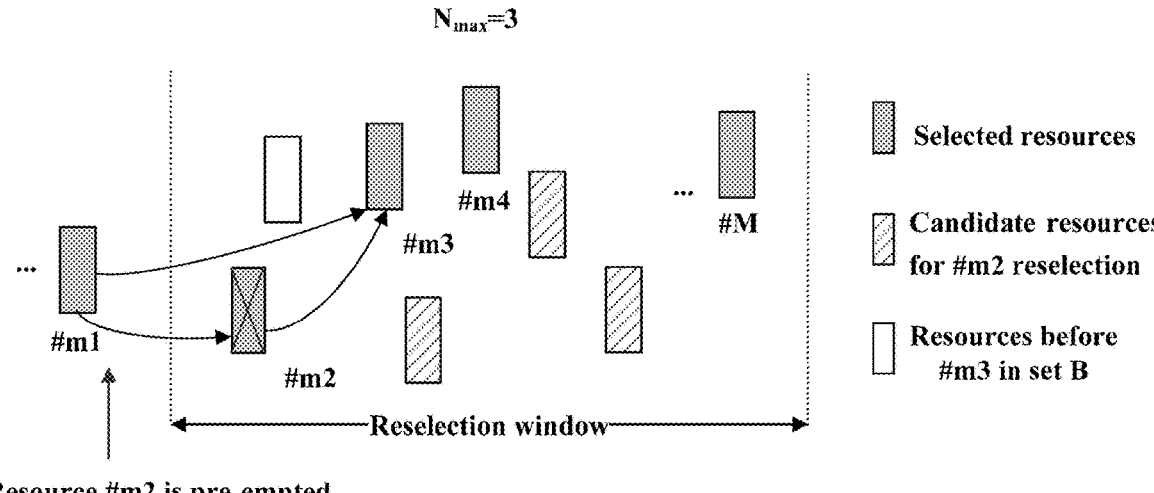
FIG. 13 is another exemplary diagram of sidelink resource reselection in pre-emption check of the embodiment of this disclosure.

FIG. 13 is another exemplary diagram of sidelink resource reselection in pre-emption check of the embodiment of this disclosure. For example, M sidelink resources are initially selected. It is assumed that $N_{max}=3$ and pre-emption check is started at a time point before resource #m2 indicated and reserved by the SCI of resource #m1, it is found that a conflict occurs in resource #m2.

As shown in FIG. 13, reselection may be performed on resource #m2 according to resources after resource #m2, i.e. resources #m3, . . . #M. That is, in the resource selection process, the selected resources #m3, . . . #M in the initial selection are reserved, and based on their time frequency positions, another resource is selected from the candidate resources satisfying the time constraints.

For example, the resource reselection needs to satisfy an additional time constraint, that is, subsequently selected resources are temporally behind a resource that has been indicated but no collision occurs therein (such as resource #m3 shown in FIG. 13). In this way, occurrence of resources that are not indicated to be reserved may be avoided, and reliability may further be increased.

In some embodiments, in a case where a maximum number $N_{max}$ of resources that the sidelink control information is able to indicate is 3 and sidelink resources not in the reselection candidate resource set are the j-th and the (j+1)-th sidelink resources, reselection is performed on the j-th and the (j+1)-th sidelink resources;

wherein two sidelink resources are selected from the sidelink resource set based on time frequency resources of a (j+2)-th sidelink resource to the $N_1$-th sidelink resource; where, $1 \leq j \leq N_1-2$, $N_1$ being the number of the multiple initially selected sidelink resources.

In some embodiments, the first sidelink resource of the two reselected sidelink resources satisfies the following conditions that:

a time interval between the first sidelink resource and at least one of the (j+2)-th sidelink resource to the $N_1$-th sidelink resource is within the predetermined range, and the first sidelink resource is not at the same slot as any one of the $(j+2)$-th sidelink resource to the $N_1$-th sidelink resource.

And the second sidelink resource of the two reselected sidelink resources satisfies the following conditions that:

a time interval between the second sidelink resource and at least one of the $(j+2)$-th sidelink resource to the $N_{11}$-th sidelink resource and the first sidelink resource is within the predetermined range, and the second sidelink resource is not at the same slot as any one of the $(j+2)$-th sidelink resource to the $N_1$-th sidelink resource and the first sidelink resource.

In some embodiments, the two reselected sidelink resources satisfy the following conditions that: the two reselected sidelink resources and any one of the first to the $N_1$-th sidelink resources are not fed back together by the physical sidelink feedback channels (PSFCHs) of a same slot, and the slot is not within a period of time (i.e. the processing time) after the slot where the physical sidelink feedback channel to which any one of the resources corresponds is at.

For example, as shown in FIG. 13, if collisions occur in the current resource and resources reserved by the same SCI (such as resource #m2 and resource #m3 shown in FIG. 13), #m2 may be reselected according to resources #m4, . . . #M.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that in a case where one or more sidelink resources are not in a reselection candidate resource set, at least one sidelink resource is reselected from the sidelink resource set; wherein a currently reselected sidelink resource set is determined according to time frequency resources of the initially selected sidelink resources. Hence, not only more times of retransmission may be supported, but also reselection resources transmitted multiple times may be ensured to be indicated and reserved by sidelink control information.

Embodiments of a Fifth Aspect

In the embodiments of this disclosure, resource reselection is performed in a one by one manner on one or more sidelink resources that are not in the reselection candidate resource set and subsequent sidelink resources. During a pre-emption check process, if it is found that resource collisions occur in resources reserved by corresponding SCI, resource reselection may be performed on the collided resources and all subsequent resources, with contents identical to those in the embodiments of the fourth aspect being not going to be described herein any further.

The embodiments of the fifth aspect may be implemented separately, or may be implemented in combination with the embodiments of the fourth aspect. For example, the embodiments of the fourth aspect may be executed first, and then the embodiments of the fifth aspect is executed, that is, resource reselection is preferentially performed on the collided resources, and if there exists no available resource, resource reselection is performed on all subsequent resources to satisfy time constraints.

In some embodiments, if the currently transmitted resource is found to be preempted by other UEs, resource reselection is performed for both the currently transmitted resource and the selected resource located behind it in time. For example, one resource is randomly selected in a selection window of reselection, and then the subsequent resources are reselected one by one based on time constraints.

In some embodiments, in a case where another sidelink resource is reserved by the sidelink control information, the another sidelink resource is taken as a sidelink resource selected for the first time in the resource reselection, and the resource in the resource reselection is behind the another sidelink resource.

For example, when $N_{max}=3$, if the current resource is preempted but there temporally exists a resource (at most one, such as resource #m3 shown in FIG. 13) that has been indicated after the current resource, after the resource reselection process is triggered, it may be deemed that the resource is a first selected resource in the resource reselection process, and then the remaining resources are selected.

For another example, the resource reselection needs to satisfy an additional time constraint, that is, subsequently selected resources should be temporally located after the indicated resource. In this way, occurrence of resources that are not indicated to be reserved may be avoided, and reliability may further be increased.

In some embodiments, that resource reselection is performed on one or more sidelink resources that are not in the reselection candidate resource set and subsequent sidelink resources one by one includes:

selecting an $(m+1)$-th sidelink resource in a case where the number of the reselected resources is m; where, $1 \leq m \leq M-1$, M being the number of resources in the multiple initially selected sidelink resources after a sidelink resource at the same slot as the sidelink control information.

In particular, former m sidelink resources and sidelink resources at the same slot as an m-th sidelink resource are excluded from the sidelink resource set to form a first set, sidelink resources in the sidelink resource set having a time interval between them and at least one sidelink resource in the selected former m sidelink resources within the predetermined range are taken as a second set, and the $(m+1)$-th sidelink resource is randomly selected with equal probability from an intersection of the first set and the second set.

In some embodiments, in a case where retransmission based on hybrid automatic repeat request (HARM) feedback is enabled, the n-th sidelink resource, sidelink resources in the same slot as the n-th sidelink resource, sidelink resources at the same slot as a physical sidelink feedback channel (PSFCH) to which the n-th sidelink resource corresponds and sidelink resources within a period of time after the physical sidelink feedback channel are excluded from the sidelink resource set to form the first set.

In some embodiments, in a case where M sidelink resources have been selected, or in a case where an intersection of the first set and the second set is null, the selected sidelink resources are ordered temporally.

For how to perform resource selection successively, reference may be made to FIG. 4 and related technologies.

The resource reselection process may be performed in a new candidate resource set (which may be referred to as a reselection candidate resource set) reported after the resource pre-emption. For a resource where collision occurs, its resource after reselection is different from that before reselection; for a resource where no collision occurs, the resource after reselection may be identical to the resource before reselection, or may be different from the resource before reselection. After the resource reselection, if the required number of resources are unable to be reselected within the above time constraints, transmission of the current TB may not be able to reach the target number of times of transmission, that is, the number of resources after reselection may possibly be less than the number M of the initial selected resources.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that in a case where one or more sidelink resources are not in a reselection candidate resource set, at least one sidelink resource is reselected from the sidelink resource set; wherein a currently reselected sidelink resource set is determined according to time frequency resources of the initially selected sidelink resources. Hence, not only more times of retransmission may be supported, but also reselection resources transmitted multiple times may be ensured to be indicated and reserved by sidelink control information.

Embodiments of a Sixth Aspect

The embodiments of this disclosure provide a sidelink resource reselection apparatus. The apparatus may be, for example, a terminal equipment (such as the above-described terminal equipment), or one or some components or assemblies configured in a terminal equipment, with contents identical to those in the embodiments of the first to fifth aspects being not going to be described herein any further.

Figure 14:
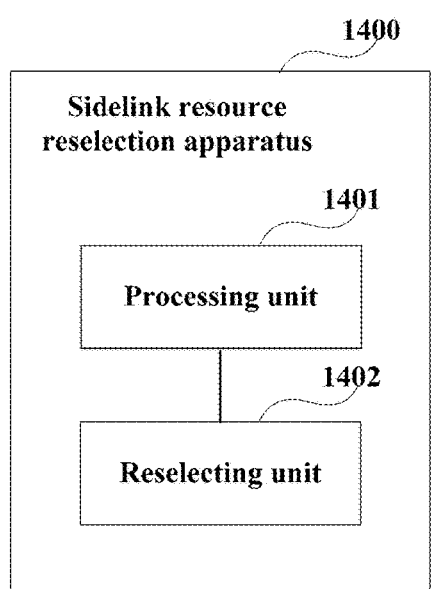
FIG. 14 is a schematic diagram of the sidelink resource reselection apparatus of an embodiment of this disclosure.

FIG. 14 is a schematic diagram of the sidelink resource reselection apparatus of the embodiment of this disclosure. As shown in FIG. 14, the sidelink resource reselection apparatus 1400 includes:

a processing unit 1401 configured to perform resource re-evaluation and/or pre-emption check on sidelink resources initially selected for performing a plurality of times of transmission of a transport block; and a reselecting unit 1402 configured to reselect at least one sidelink resource from a sidelink resource set in a case where one or more sidelink resources are not in a reselection candidate resource set; wherein a currently reselected sidelink resource set is determined according to time frequency sources of the initially selected sidelink resources.

In some embodiments, the processing unit 1401 performs the resource re-evaluation at a time point before an i-th initially selected sidelink resource, and determines that one or more sidelink resources of sidelink control information are not in the reselection candidate resource set; where, i is an integer;

and the reselecting unit 1402 performs resource reselection on the one or more sidelink resources not in the reselection candidate resource set.

In some embodiments, in a case where a maximum number $N_{max}$ of resources that the sidelink control information is able to indicate is 2 or 3 and a sidelink resource not in the reselection candidate resource set is an (i+1)-th or (i+2)-th sidelink resource, reselection is performed on the (i+1)-th or (i+2)-th sidelink resource;

wherein a sidelink resource is reselected from the sidelink resource set based on time frequency resources of the i-th sidelink resource and the (i+2)-th sidelink resource to an $N_1$-th sidelink resource; where, $1 \leq i \leq N_1 - 2$, $N_1$ being the number of the multiple initially selected sidelink resources.

In some embodiments, in a case where a time interval between the i-th sidelink resource and the (i+2)-th sidelink resource is within a predetermined range, the reselected sidelink resource satisfies the following condition that:

a time interval between the reselected sidelink resource and at least one of the i-th sidelink resource and the (i+2)-th sidelink resource to the $N_1$-th sidelink resource is within the predetermined range, and the reselected sidelink resource is not at the same slot as any one of the i-th sidelink resource and the (i+2)-th sidelink resource to the $N_1$-th sidelink resource.

In some embodiments, in a case where the time interval between the i-th sidelink resource and the (i+2)-th sidelink resource is not within the predetermined range, the reselected sidelink resource satisfies the following conditions that:

a time interval between the reselected sidelink resource and at least one of the i-th sidelink resource and the (i+2)-th sidelink resource to the $N_1$-th sidelink resource is within the predetermined range, and the reselected sidelink resource is not at the same slot as any one of the i-th sidelink resource and the (i+2)-th sidelink resource to the $N_1$-th sidelink resource; and time intervals between the reselected sidelink resource and the i-th sidelink resource and the (i+2)-th sidelink resource are all within the predetermined range, and the reselected sidelink resource is temporally after the i-th sidelink resource and before the (i+2)-th sidelink resource.

In some embodiments, in a case where the maximum number $N_{max}$ of resources that the sidelink control information is able to indicate is 2 or 3 and the sidelink resource not in the reselection candidate resource set is the $N_1$-th sidelink resource, the reselected sidelink resource satisfies the following conditions that:

a time interval between the reselected sidelink resource and at least one of the i-th sidelink resource to the $(N_1-1)$-th sidelink resource is within the predetermined range, and the reselected sidelink resource is not at the same slot as any one of the i-th sidelink resource to the $(N_1-1)$-th sidelink resource.

In some embodiments, the reselected sidelink resource further satisfies the following conditions that: the reselected sidelink resource and any one of a first to the $N_1$-th sidelink resources are not fed back together by physical sidelink feedback channels of a same slot, and the slot is not within a period of time after a slot where a physical sidelink feedback channel to which any one of the resources corresponds is at.

In some embodiments, the reselected sidelink resource further satisfies the following condition that: the reselected sidelink resource is after a sidelink resource which is at the same slot as the physical sidelink control channel of the sidelink control information.

In some embodiments, in a case where the maximum number $N_{max}$ of resources that the sidelink control information is able to indicate is 3 and the sidelink resources not in the reselection candidate resource set are the (i+1)-th and (i+2)-th sidelink resources, reselection is performed on the (i+1)-th and (i+2)-th sidelink resources;

wherein two sidelink resources are selected from the sidelink resource set based on time frequency resources of the i-th sidelink resource and a (i+3)-th sidelink resource to the $N_1$-th sidelink resource; where, $1 \leq i \leq N_1 - 3$, $N_1$ being the number of the multiple initially selected sidelink resources.

In some embodiments, in a case where a time interval between the i-th sidelink resource and the (i+3)-th sidelink resource is not within the predetermined range, the first sidelink resource of the two reselected sidelink resources satisfies the following conditions that:

a time interval between the first sidelink resource and at least one of the i-th sidelink resource and the (i+3)-th sidelink resource to the $N_1$-th sidelink resource is within the predetermined range, and the first sidelink resource is not at the same slot as any one of the i-th sidelink resource and the (i+3)-th sidelink resource to the $N_1$-th sidelink resource; and a time interval between the first sidelink resource and the i-th sidelink resource or the (i+3)-th sidelink resource is within the predetermined range, and the first sidelink resource is temporally after the i-th sidelink resource and before the (i+3)-th sidelink resource.

In some embodiments, the second sidelink resource of the two reselected sidelink resources satisfies the following conditions that:

in a case where a time interval between the first sidelink resource and the i-th sidelink resource is within the predetermined range, time intervals between the second sidelink resource and the first sidelink resource and the (i+3)-th sidelink resource are all within the predetermined range, and the second sidelink resource is temporally after the i-th sidelink resource and before the (i+3)-th sidelink resource; and in a case where a time interval between the first sidelink resource and the (i+3)-th sidelink resource is within the predetermined range, time intervals between the second sidelink resource and the first sidelink resource and the i-th sidelink resource are all within the predetermined range, and the second sidelink resource is temporally after the i-th sidelink resource and before the (i+3)-th sidelink resource.

In some embodiments, in a case where the maximum number $N_{max}$ of resources that the sidelink control information is able to indicate is 3 and the sidelink resources not in the reselection candidate resource set are the $(N_1-1)$-th and $N_1$-th sidelink resources, the first sidelink resource of the two reselected sidelink resources satisfies the following conditions that: a time interval between the first sidelink resource and at least one of the i-th sidelink resource to an $(N_1-2)$-th sidelink resource is within the predetermined range, and the first sidelink resource is not at the same slot as any one of the i-th sidelink resource to the $(N_1-2)$-th sidelink resource;

the second sidelink resource of the two reselected sidelink resources satisfies the following conditions that: a time interval between the second sidelink resource and at least one of the i-th sidelink resource to the $(N_1-2)$-th sidelink resource and the first sidelink resource is within the predetermined range, and the second sidelink resource is not at the same slot as any one of the i-th sidelink resource to the $(N_1-2)$-th sidelink resource and the first sidelink resource;

and the two reselected sidelink resources satisfy the following conditions that: the two reselected sidelink resources and any one of the first to the $N_1$-th sidelink resources are not fed back together by the physical sidelink feedback channels of a same slot, and the slot is not within a period of time after the slot where the physical sidelink feedback channel to which any one of the resources corresponds is at.

In some embodiments, the processing unit 1401 performs the resource re-evaluation at a time point before an i-th initially selected sidelink resource, and determines that one or more sidelink resources of sidelink control information are not in the reselection candidate resource set; where, i is an integer;

and the reselecting unit 1402 performs resource reselection on the one or more sidelink resources not in the reselection candidate resource set and subsequent candidate resources one by one, and selects an (n+1)-th sidelink resource in a case where the number of the reselected resources is n; where, $1 \leq n \leq N-1$, N being the number of a sidelink resource at the same slot as the sidelink control information and subsequent resources in the multiple initially selected sidelink resources selected in an initial selection process.

In some embodiments, former n sidelink resources and one or more sidelink resources at the same slot as the n-th sidelink resource are excluded from the sidelink resource set to form a first set, sidelink resources in the sidelink resource set having a time interval between them and at least one sidelink resource in the selected former n sidelink resources within a predetermined range are taken as a second set, and the (n+1)-th sidelink resource is randomly selected with equal probability from an intersection of the first set and the second set.

In some embodiments, a sidelink resource at the same slot as a physical sidelink control channel of the sidelink control information is taken as a sidelink resource selected at a first time of the resource reselection.

In a case where another sidelink resource is reserved by the sidelink control information, the another sidelink resource is not subjected to reselection and is taken as a sidelink resource selected at a second time of the resource reselection.

In some embodiments, in a case where another sidelink resource is reserved by the sidelink control information, the another sidelink resource is not subjected to reselection and is taken as a sidelink resource selected at the first time of the resource reselection;

and the sidelink resource at the same slot as the physical sidelink control channel of the sidelink control information is taken as the sidelink resource selected at the second time of the resource reselection.

In some embodiments, the processing unit 1401 performs the pre-emption check on a j-th initially selected sidelink resource and subsequent sidelink resources, and determines that one or more sidelink resources of sidelink control information are not in the reselection candidate resource set; where, j is an integer;

and the reselecting unit 1402 performs resource reselection on the one or more sidelink resources not in the reselection candidate resource set.

In some embodiments, in a case where a maximum number $N_{max}$ of resources that the sidelink control information is able to indicate is 2 or 3 and a sidelink resource not in the reselection candidate resource set is a j-th sidelink resource, reselection is performed on the j-th sidelink resource;

wherein a sidelink resource is reselected from the sidelink resource set based on time frequency resources of a (j+1)-th sidelink resource to the $N_1$-th sidelink resource; where, $1 \leq j \leq N_1-1$, $N_1$ being the number of the multiple initially selected sidelink resources.

In some embodiments, the reselected sidelink resource satisfies the following conditions that:

a time interval between the reselected sidelink resource and at least one of the (j+1)-th sidelink resource to the $N_1$-th sidelink resource is within the predetermined range, and the reselected sidelink resource is not at the same slot as any one of the (j+1)-th sidelink resource to the $N_1$-th sidelink resource;

and the reselected sidelink resource further satisfies the following conditions that: the reselected sidelink resource and any one of a first to the $N_1$-th sidelink resources are not fed back together by physical sidelink feedback channels of a same slot, and the slot is not within a period of time after a slot where a physical sidelink feedback channel to which any one of the resources corresponds is at.

In some embodiments, the maximum number $N_{max}$ of resources that the sidelink control information is able to indicate is 3, the reselected sidelink resource further satisfies the following conditions that:

the reselected sidelink resource is after another sidelink resource indicated by the same sidelink control information, and the another sidelink resource is within the reselection candidate resource set and after a slot of the sidelink control information.

In some embodiments, in a case where a maximum number $N_{max}$ of resources that the sidelink control information is able to indicate is 3 and sidelink resources not in the reselection candidate resource set are the j-th and the (j+1)-th sidelink resources, reselection is performed on the j-th and the (j+1)-th sidelink resources;

wherein two sidelink resources are selected from the sidelink resource set based on time frequency resources of a (j+2)-th sidelink resource to the $N_1$-th sidelink resource; where, $1 \leq j \leq N_1-2$, $N_1$ being the number of the multiple initially selected sidelink resources.

In some embodiments, the first sidelink resource of the two reselected sidelink resources satisfies the following conditions that:

a time interval between the first sidelink resource and at least one of the (j+2)-th sidelink resource to the $N_1$-th sidelink resource is within the predetermined range, and the first sidelink resource is not at the same slot as any one of the (j+2)-th sidelink resource to the $N_1$-th sidelink resource;

the second sidelink resource of the two reselected sidelink resources satisfies the following conditions that:

a time interval between the second sidelink resource and at least one of the (j+2)-th sidelink resource to the $N_1$-th sidelink resource and the first sidelink resource is within the predetermined range, and the second sidelink resource is not at the same slot as any one of the (j+2)-th sidelink resource to the $N_1$-th sidelink resource and the first sidelink resource;

and the two reselected sidelink resources satisfy the following conditions that: the two reselected sidelink resources and any one of the first to the $N_1$-th sidelink resources are not fed back together by the physical sidelink feedback channels of a same slot, and the slot is not within a period of time after the slot where the PSFCH to which any one of the resources corresponds is at.

In some embodiments, the processing unit 1401 performs the pre-emption check on a j-th initially selected sidelink resource and subsequent sidelink resources, and determines that one or more sidelink resources of sidelink control information are not in the reselection candidate resource set; where, j is an integer;

and the reselecting unit 1402 performs resource reselection on the one or more sidelink resources not in the reselection candidate resource set and subsequent candidate resources one by one, and selects an (m+1)-th sidelink resource in a case where the number of the reselected resources is m; where, $1 \leq m \leq M-1$, M being the number of resources in the multiple initially selected sidelink resources after a sidelink resource at the same slot as the sidelink control information.

In some embodiments, former m sidelink resources and sidelink resources at the same slot as an m-th sidelink resource are excluded from the sidelink resource set to form a first set, sidelink resources in the sidelink resource set having a time interval between them and at least one sidelink resource in the selected former m sidelink resources within the predetermined range are taken as a second set, and the (m+1)-th sidelink resource is randomly selected with equal probability from an intersection of the first set and the second set.

In some embodiments, in a case where another sidelink resource is reserved by the sidelink control information, the another sidelink resource is taken as a sidelink resource selected for the first time in the resource reselection, and the resources of the resource reselection are after the another sidelink resource.

In some embodiments, time intervals between the reselected sidelink resources and a slot where the physical sidelink control channel of the sidelink control information are greater than or equal to a predetermined value.

In some embodiments, for a reselection sidelink resource of which retransmission is enabled based on hybrid automatic repeat request feedback, in a case where the reselection sidelink resource is fed back together with any selected resource by physical sidelink feedback channels at the same slot or the reselection sidelink resource is within a period of time when a physical sidelink feedback channel to which any selected resource corresponds performs decoding, the retransmission of the reselection sidelink resource based on the hybrid automatic repeat request feedback is disabled, or retransmission of all reselection sidelink resources based on the hybrid automatic repeat request feedback are disabled.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the sidelink resource reselection apparatus 1400 may further include other components or modules, and reference may be made to the related techniques for specific contents of these components or modules.

Furthermore, for the sake of simplicity, connection relationships between the components or modules or signal profiles thereof are only illustrated in FIG. 14. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that in a case where one or more sidelink resources are not in a reselection candidate resource set, at least one sidelink resource is reselected from the sidelink resource set; wherein a currently reselected sidelink resource set is determined according to time frequency resources of the initially selected sidelink resources. Hence, not only more times of retransmission may be supported, but also reselection resources transmitted multiple times may be ensured to be indicated and reserved by sidelink control information.

Embodiments of a Seventh Aspect

The embodiments of this disclosure provide a communication system, and reference may be made to FIG. 1, with contents identical to those in the embodiments of the first to the sixth aspects being not going to be described herein any further.

In some embodiments, the communication system 100 may at least include:

a terminal equipment configured to perform resource re-evaluation and/or pre-emption check on sidelink resources initially selected for performing a plurality of times of transmission of a transport block, and reselect at least one sidelink resource from a sidelink resource set in a case where one or more sidelink resources are not in a reselection candidate resource set; wherein a currently reselected sidelink resource set is determined according to time frequency sources of the initially selected sidelink resources.

The embodiment of this disclosure further provides a network device, which may be, for example, a base station. However, this disclosure is not limited thereto, and it may also be another network device.

Figure 15:
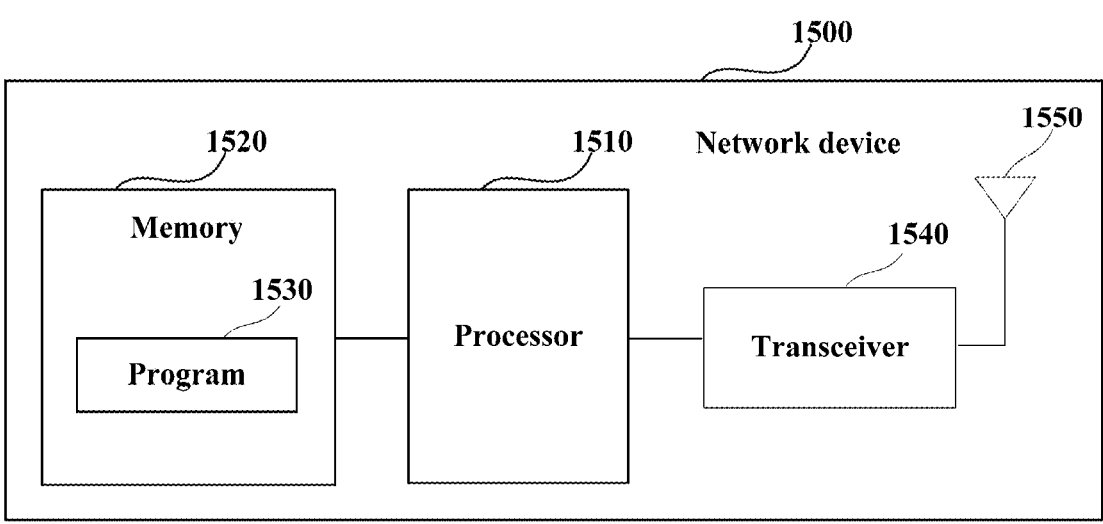
FIG. 15 is a schematic diagram of the network device of an embodiment of this disclosure.

FIG. 15 is a schematic diagram of a structure of the network device of the embodiment of this disclosure. As shown in FIG. 15, the network device 1500 may include a processor 1510 (such as a central processing unit (CPU)) and a memory 1520, the memory 1520 being coupled to the processor 1510. The memory 1520 may store various data, and furthermore, it may store a program 1530 for data processing, and execute the program 1530 under control of the processor 1510.

Furthermore, as shown in FIG. 15, the network device 1500 may include a transceiver 1540, and an antenna 1550, etc. Functions of the above components are similar to those in the relevant art, and shall not be described herein any further. It should be noted that the network device 1500 does not necessarily include all the parts shown in FIG. 15, and furthermore, the network device 1500 may include parts not shown in FIG. 15, and the relevant art may be referred to.

The embodiment of this disclosure further provides a terminal equipment; however, this disclosure is not limited thereto, and it may also be another equipment.

Figure 16:
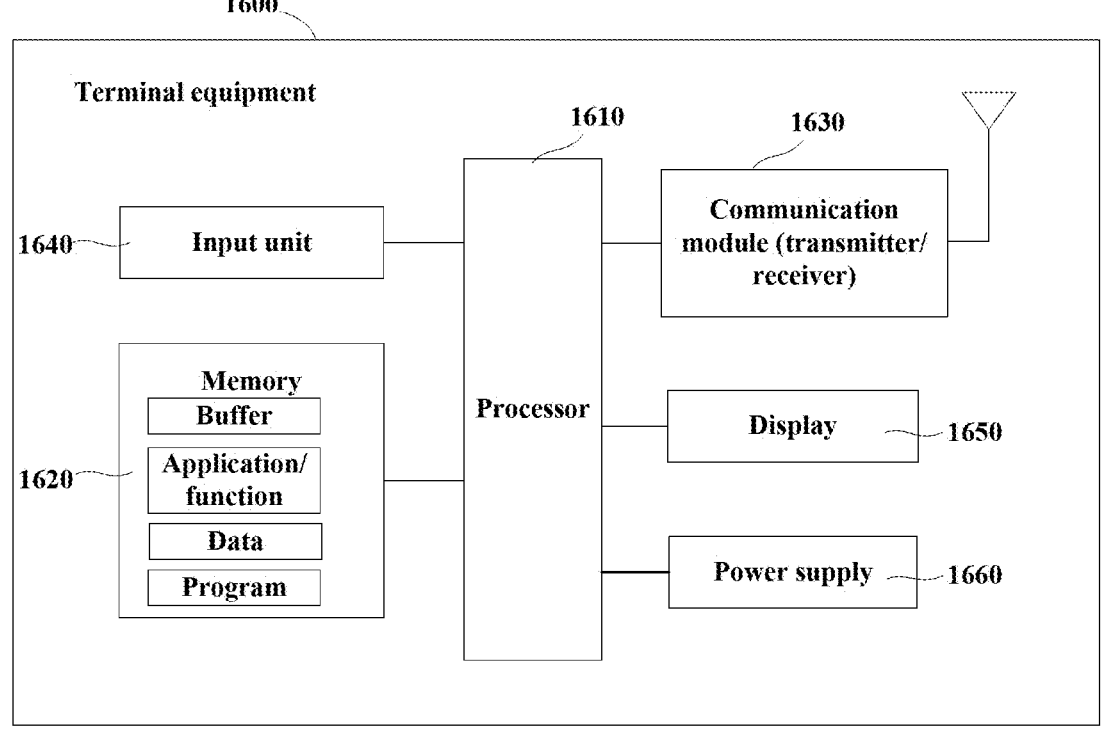
FIG. 16 is a schematic diagram of the terminal equipment of an embodiment of this disclosure.

FIG. 16 is a schematic diagram of the terminal equipment of the embodiment of this disclosure. As shown in FIG. 16, the terminal equipment 1600 may include a processor 1610 and a memory 1620, the memory 1620 storing data and a program and being coupled to the processor 1610. It should be noted that this figure is illustrative only, and other types of structures may also be used, so as to supplement or replace this structure and achieve a telecommunications function or other functions.

For example, the processor 1610 may be configured to execute a program to carry out the sidelink resource reselection method as described in the embodiments of the first to the fifth aspects. For example, the processor 1610 may be configured to perform the following control: performing resource re-evaluation and/or pre-emption check on sidelink resources initially selected for performing a plurality of times of transmission of a transport block; and reselecting at least one sidelink resource from a sidelink resource set in a case where one or more sidelink resources are not in a reselection candidate resource set; wherein a currently reselected sidelink resource set is determined according to time frequency sources of the initially selected sidelink resources.

As shown in FIG. 16, the terminal equipment 1600 may further include a communication module 1630, an input unit 1640, a display 1650, and a power supply 1660. Functions of the above components are similar to those in the relevant art, which shall not be described herein any further. It should be noted that the terminal equipment 1600 does not necessarily include all the parts shown in FIG. 16, and the above components are not necessary. Furthermore, the terminal equipment 1600 may include parts not shown in FIG. 16, and the relevant art may be referred to.

An embodiment of this disclosure provides a computer program, which, when executed in a terminal equipment, will cause the terminal equipment to carry out the sidelink resource reselection method as described in the embodiments of the first to the fifth aspects.

An embodiment of this disclosure provides a storage medium, including a computer program, which will cause a terminal equipment to carry out the sidelink resource reselection method as described in the embodiments of the first to the fifth aspects.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

As to implementations containing the above embodiments, following supplements are further disclosed.

Supplement 1. A sidelink resource reselection method, including:

performing resource re-evaluation and/or pre-emption check on sidelink resources initially selected for performing a plurality of times of transmission of a transport block; and reselecting at least one sidelink resource from a sidelink resource set in a case where one or more sidelink resources are not in a reselection candidate resource set; wherein a currently reselected sidelink resource set is determined according to time frequency sources of the initially selected sidelink resources.

Supplement 2. The method according to supplement 1, wherein the resource re-evaluation is performed at a time point before an i-th initially selected sidelink resource, and determines that one or more sidelink resources of sidelink control information are not in the reselection candidate resource set; where, i is an integer.

Supplement 3. The method according to supplement 2, wherein resource reselection is performed on the one or more sidelink resources not in the reselection candidate resource set.

Supplement 4. The method according to supplement 3, wherein in a case where a maximum number $N_{max}$ of resources that the sidelink control information is able to indicate is 2 or 3 and a sidelink resource not in the reselection candidate resource set is an (i+1)-th or (i+2)-th sidelink resource, reselection is performed on the (i+1)-th or (i+2)-th sidelink resource;

wherein a sidelink resource is reselected from the sidelink resource set based on time frequency resources of the i-th sidelink resource and the (i+2)-th sidelink resource to an $N_1$-th sidelink resource; where, $1 \le i \le N_1-2$, $N_1$ being the number of the multiple initially selected sidelink resources.

Supplement 5. The method according to supplement 4, wherein, in a case where a time interval between the i-th sidelink resource and the (i+2)-th sidelink resource is within a predetermined range, the reselected sidelink resource satisfies the following condition that:

a time interval between the reselected sidelink resource and at least one of the i-th sidelink resource and the (i+2)-th sidelink resource to the $N_1$-th sidelink resource is within the predetermined range, and the reselected sidelink resource is not at the same slot as any one of the i-th sidelink resource and the (i+2)-th sidelink resource to the $N_1$-th sidelink resource.

Supplement 6. The method according to supplement 4, wherein, in a case where the time interval between the i-th sidelink resource and the (i+2)-th sidelink resource is not within the predetermined range, the reselected sidelink resource satisfies the following conditions that:

a time interval between the reselected sidelink resource and at least one of the i-th sidelink resource and the (i+2)-th sidelink resource to the $N_1$-th sidelink resource is within the predetermined range, and the reselected sidelink resource is not at the same slot as any one of the i-th sidelink resource and the (i+2)-th sidelink resource to the $N_1$-th sidelink resource; and time intervals between the reselected sidelink resource and the i-th sidelink resource and the (i+2)-th sidelink resource are all within the predetermined range, and the reselected sidelink resource is temporally after the i-th sidelink resource and before the (i+2)-th sidelink resource.

Supplement 7. The method according to any one of supplements 4-6, wherein in a case where the maximum number $N_{max}$ of resources that the sidelink control information is able to indicate is 2 or 3 and the sidelink resource not in the reselection candidate resource set is the $N_1$-th sidelink resource, the reselected sidelink resource satisfies the following conditions that:

a time interval between the reselected sidelink resource and at least one of the i-th sidelink resource to the $(N_1-1)$-th sidelink resource is within the predetermined range, and the reselected sidelink resource is not at the same slot as any one of the i-th sidelink resource to the $(N_1-1)$-th sidelink resource.

Supplement 8. The method according to any one of supplements 4-7, wherein the reselected sidelink resource further satisfies the following conditions that:

the reselected sidelink resource and any one of a first to the $N_1$-th sidelink resources are not fed back together by physical sidelink feedback channels (PSFCHs) of a same slot, and the slot is not within a period of time (i.e. the processing time) after a slot where a PSFCH to which any one of the resources corresponds is at.

Supplement 9. The method according to any one of supplements 4-8, wherein the reselected sidelink resource further satisfies the following condition that:

the reselected sidelink resource is after a sidelink resource which is at the same slot as the physical sidelink control channel (PSCCH) of the sidelink control information.

Supplement 10. The method according to supplement 3, wherein in a case where the maximum number $N_{max}$ of resources that the sidelink control information is able to indicate is 3 and the sidelink resources not in the reselection candidate resource set are the (i+1)-th and (i+2)-th sidelink resources, reselection is performed on the (i+1)-th and (i+2)-th sidelink resources;

wherein two sidelink resources are selected from the sidelink resource set based on time frequency resources of the i-th sidelink resource and a (i+3)-th sidelink resource to the $N_1$-th sidelink resource; where, $1 \le i \le N_1-3$, $N_1$ being the number of the multiple initially selected sidelink resources.

Supplement 11. The method according to supplement 10, wherein in a case where a time interval between the i-th sidelink resource and the (i+3)-th sidelink resource is not within the predetermined range, the first sidelink resource of the two reselected sidelink resources satisfies the following conditions that:

a time interval between the first sidelink resource and at least one of the i-th sidelink resource and the (i+3)-th sidelink resource to the $N_1$-th sidelink resource is within the predetermined range, and the first sidelink resource is not at the same slot as any one of the i-th sidelink resource and the (i+3)-th sidelink resource to the $N_1$-th sidelink resource; and a time interval between the first sidelink resource and the i-th sidelink resource or the (i+3)-th sidelink resource is within the predetermined range, and the first sidelink resource is temporally after the i-th sidelink resource and before the (i+3)-th sidelink resource.

Supplement 12. The method according to supplement 11, wherein the second sidelink resource of the two reselected sidelink resources satisfies the following conditions that:

in a case where a time interval between the first sidelink resource and the i-th sidelink resource is within the predetermined range, time intervals between the second sidelink resource and the first sidelink resource and the (i+3)-th sidelink resource are all within the predetermined range, and the second sidelink resource is temporally after the i-th sidelink resource and before the (i+3)-th sidelink resource; and in a case where a time interval between the first sidelink resource and the (i+3)-th sidelink resource is within the predetermined range, time intervals between the second sidelink resource and the first sidelink resource and the i-th sidelink resource are all within the predetermined range, and the second sidelink resource is temporally after the i-th sidelink resource and before the (i+3)-th sidelink resource.

Supplement 13. The method according to any one of supplements 10-12, wherein in a case where the maximum number $N_{max}$ of resources that the sidelink control information is able to indicate is 3 and the sidelink resources not in the reselection candidate resource set are the $(N_1-1)$-th and $N_1$-th sidelink resources, the first sidelink resource of the two reselected sidelink resources satisfies the following conditions that: a time interval between the first sidelink resource and at least one of the i-th sidelink resource to an $(N_1-2)$-th sidelink resource is within the predetermined range, and the first sidelink resource is not at the same slot as any one of the i-th sidelink resource to the $(N_1-2)$-th sidelink resource;

the second sidelink resource of the two reselected sidelink resources satisfies the following conditions that: a time interval between the second sidelink resource and at least one of the i-th sidelink resource to the $(N_1-2)$-th sidelink resource and the first sidelink resource is within the predetermined range, and the second sidelink resource is not at the same slot as any one of the i-th sidelink resource to the $(N_1-2)$-th sidelink resource and the first sidelink resource.

Supplement 14. The method according to any one of supplements 10-13, wherein the two reselected sidelink resources satisfy the following conditions that:

the two reselected sidelink resources and any one of the first to the $N_1$-th sidelink resources are not fed back together by the physical sidelink feedback channels (PSFCHs) of a same slot, and the slot is not within a period of time (i.e. the processing time) after the slot where the physical sidelink feedback channel to which any one of the resources corresponds is at.

Supplement 15. The method according to any one of supplements 2-14, wherein resource reselection is performed in a one by one manner on one or more sidelink resources that are not in the reselection candidate resource set and subsequent sidelink resources.

Supplement 16. The method according to supplement 15, wherein a sidelink resource in the same slot as a physical sidelink control channel (PSCCH) of sidelink control information is taken as a sidelink resource selected for the first time in the resource reselection.

Supplement 17. The method according to supplement 16, wherein in a case where another sidelink resource is reserved by the sidelink control information, the another sidelink resource is not subjected to reselection and is taken as a sidelink resource selected at a second time of the resource reselection.

Supplement 18. The method according to supplement 15, wherein in a case where another sidelink resource is reserved by the sidelink control information, the another sidelink resource is not subjected to reselection and is taken as a sidelink resource selected at the first time of the resource reselection.

Supplement 19. The method according to supplement 18, wherein the sidelink resource at the same slot as the physical sidelink control channel (PSCCH) of the sidelink control information is taken as the sidelink resource selected at the second time of the resource reselection.

Supplement 20. The method according to any one of supplements 15-19, wherein the performing resource reselection on the one or more sidelink resources not in the reselection candidate resource set and subsequent candidate resources one by one includes:

selecting an (n+1)-th sidelink resource in a case where the number of the reselected resources is n; where, $1 \leq n \leq N-1$, N being the number of a sidelink resource at the same slot as the sidelink control information and subsequent resources in the multiple initially selected sidelink resources selected in an initial selection process.

Supplement 21. The method according to supplement 20, wherein, former n sidelink resources and one or more sidelink resources at the same slot as the n-th sidelink resource are excluded from the sidelink resource set to form a first set;

sidelink resources in the sidelink resource set having a time interval between them and at least one sidelink resource in the selected former n sidelink resources within a predetermined range are taken as a second set;

and the (n+1)-th sidelink resource is randomly selected with equal probability from an intersection of the first set and the second set.

Supplement 22. The method according to supplement 21, wherein the method further includes:

in a case where retransmission based on hybrid automatic repeat request (HARQ) feedback is enabled, the n-th sidelink resource, sidelink resources in the same slot as the n-th sidelink resource, excluding sidelink resources at the same slot as a physical sidelink feedback channel (PSFCH) to which the n-th sidelink resource corresponds and sidelink resources within a period of time after the physical sidelink feedback channel from the sidelink resource set to form the first set.

Supplement 23. The method according to supplement 21 or 22, wherein the method further includes:

in a case where N sidelink resources have been selected, or in a case where an intersection of the first set and the second set is null, temporally ordering the selected sidelink resources.

Supplement 24. The method according to supplement 1, wherein the pre-emption check is performed on a j-th initially selected sidelink resource and subsequent sidelink resources, and that one or more sidelink resources of sidelink control information are not in the reselection candidate resource set is determined; where, j is an integer.

Supplement 25. The method according to supplement 24, wherein resource reselection is performed on the one or more sidelink resources not in the reselection candidate resource set.

Supplement 26. The method according to supplement 25, wherein in a case where a maximum number $N_{max}$ of resources that the sidelink control information is able to indicate is 2 or 3 and a sidelink resource not in the reselection candidate resource set is a j-th sidelink resource, reselection is performed on the j-th sidelink resource;

wherein a sidelink resource is reselected from the sidelink resource set based on time frequency resources of a (j+1)-th sidelink resource to the $N_1$-th sidelink resource; where, $1 \leq j \leq N_1-1$, $N_1$ being the number of the multiple initially selected sidelink resources.

Supplement 27. The method according to supplement 26, wherein the reselected sidelink resource satisfies the following conditions that:

a time interval between the reselected sidelink resource and at least one of the (j+1)-th sidelink resource to the $N_1$-th sidelink resource is within the predetermined range, and the reselected sidelink resource is not at the same slot as any one of the (j+1)-th sidelink resource to the $N_1$-th sidelink resource.

Supplement 28. The method according to supplement 27, wherein the reselected sidelink resource further satisfies the following conditions that:

the reselected sidelink resource and any one of a first to the $N_1$-th sidelink resources are not fed back together by physical sidelink feedback channels (PSFCHs) of a same slot, and the slot is not within a period of time (i.e. the processing time) after a slot where a physical sidelink feedback channel to which any one of the resources corresponds is at.

Supplement 29. The method according to any one of supplements 26-28, wherein the maximum number $N_{max}$ of resources that the sidelink control information is able to indicate is 3, the reselected sidelink resource further satisfies the following conditions that:

the reselected sidelink resource is after another sidelink resource indicated by the same sidelink control information, and the another sidelink resource is within the reselection candidate resource set and after a slot of the sidelink control information.

Supplement 30. The method according to supplement 25, wherein in a case where a maximum number $N_{max}$ of resources that the sidelink control information is able to indicate is 3 and sidelink resources not in the reselection candidate resource set are the j-th and the (j+1)-th sidelink resources, reselection is performed on the j-th and the (j+1)-th sidelink resources;

wherein two sidelink resources are selected from the sidelink resource set based on time frequency resources of a (j+2)-th sidelink resource to the $N_1$-th sidelink resource; where, $1 \leq j \leq N_1-2$, $N_1$ being the number of the multiple initially selected sidelink resources.

Supplement 31. The method according to supplement 30, wherein the first sidelink resource of the two reselected sidelink resources satisfies the following conditions that:

a time interval between the first sidelink resource and at least one of the (j+2)-th sidelink resource to the $N_1$-th sidelink resource is within the predetermined range, and the first sidelink resource is not at the same slot as any one of the (j+2)-th sidelink resource to the $N_1$-th sidelink resource.

Supplement 32. The method according to supplement 31, wherein the second sidelink resource of the two reselected sidelink resources satisfies the following conditions that:

a time interval between the second sidelink resource and at least one of the (j+2)-th sidelink resource to the $N_1$-th sidelink resource and the first sidelink resource is within the predetermined range, and the second sidelink resource is not at the same slot as any one of the (j+2)-th sidelink resource to the $N_1$-th sidelink resource and the first sidelink resource.

Supplement 33. The method according to any one of supplements 30-32, wherein the two reselected sidelink resources satisfy the following conditions that:

the two reselected sidelink resources and any one of the first to the $N_1$-th sidelink resources are not fed back together by the physical sidelink feedback channels (PSFCHs) of a same slot, and the slot is not within a period of time (i.e. the processing time) after the slot where the physical sidelink feedback channel to which any one of the resources corresponds is at.

Supplement 34. The method according to any one of supplements 25-33, wherein resource reselection is performed in a one by one manner on one or more sidelink resources that are not in the reselection candidate resource set and subsequent sidelink resources.

Supplement 35. The method according to supplement 34, wherein in a case where another sidelink resource is reserved by the sidelink control information, the another sidelink resource is taken as a sidelink resource selected at a first time of the resource reselection, and the resource of the resource reselection is after the another sidelink resource.

Supplement 36. The method according to supplement 34 or 35, wherein the performing resource reselection on the one or more sidelink resources not in the reselection candidate resource set and subsequent candidate resources one by one includes:

selecting an (m+1)-th sidelink resource in a case where the number of the reselected resources is m; where, $1 \leq m \leq M-1$, M being the number of resources in the multiple initially selected sidelink resources after a sidelink resource at the same slot as the sidelink control information.

Supplement 37. The method according to supplement 36, wherein, former m sidelink resources and sidelink resources at the same slot as an m-th sidelink resource are excluded from the sidelink resource set to form a first set;

sidelink resources in the sidelink resource set having a time interval between them and at least one sidelink resource in the selected former m sidelink resources within the predetermined range are taken as a second set;

and the (m+1)-th sidelink resource is randomly selected with equal probability from an intersection of the first set and the second set.

Supplement 38. The method according to supplement 37, wherein the method further includes:

in a case where retransmission based on hybrid automatic repeat request (HARM) feedback is enabled, excluding the n-th sidelink resource, sidelink resources in the same slot as the n-th sidelink resource, sidelink resources at the same slot as a physical sidelink feedback channel (PSFCH) to which the n-th sidelink resource corresponds and sidelink resources within a period of time after the physical sidelink feedback channel from the sidelink resource set to form the first set.

Supplement 39. The method according to supplement 37 or 38, wherein the method further includes:

in a case where M sidelink resources have been selected, or in a case where an intersection of the first set and the second set is null, temporally ordering the selected sidelink resources.

Supplement 40. The method according to any one of supplements 1-39, wherein a time interval between the reselected sidelink resources and a slot where a physical sidelink control channel (PSCCH) of the sidelink control information is located is greater than or equal to a predetermined value (T3).

Supplement 41. The method according to any one of supplements 1-40, wherein the method further includes:

for a reselection sidelink resource of which retransmission is enabled based on hybrid automatic repeat request feedback (HARQ), in a case where the reselection sidelink resource is fed back together with any selected resource by physical sidelink feedback channels (PSFCHs) at the same slot or the reselection sidelink resource is within a period of time when a physical sidelink feedback channel to which any selected resource corresponds performs decoding, disabling the retransmission of the reselection sidelink resource based on the hybrid automatic repeat request feedback, or disabling retransmission of all reselection sidelink resources based on the hybrid automatic repeat request feedback (HARQ).

Supplement 42. A terminal equipment, including a memory and a processor, the memory storing a computer program, and the processor being configured to execute the computer program to carry out the sidelink resource reselection method as described in any one of supplements 1-41.

Supplement 43. A communication system, including:

a terminal equipment configured to perform resource re-evaluation and/or pre-emption check on sidelink resources initially selected for performing a plurality of times of transmission of a transport block, and reselect at least one sidelink resource from a sidelink resource set in a case where one or more sidelink resources are not in a reselection candidate resource set; wherein a currently reselected sidelink resource set is determined according to time frequency sources of the initially selected sidelink resources.

What is claimed is:

1. A sidelink resource reselection apparatus, comprising:
first processor circuitry configured to perform resource re-evaluation and/or pre-emption check on sidelink resources initially selected for performing a plurality of times of transmission of a transport block; and
second processor circuitry configured to reselect one or more sidelink resources from a sidelink resource set in a case where the one or more sidelink resources are not in a reselection candidate resource set;
wherein, after reselection, a sidelink resource for retransmission is configured to be indicated by a sidelink control information, and a time gap between a re-selected first sidelink resource and a second sidelink resource is ensured such that the re-selected first sidelink resource is not within a time after a slot where a physical sidelink feedback channel to which the second sidelink resource corresponds is at, wherein the first processor circuitry performs the resource re-evaluation at a time point before the i-th initially selected sidelink resource, and determines that one or more sidelink resources of the sidelink control information are not in the reselection candidate resource set; where, i is an integer, the second processor circuitry performs resource reselection on the one or more sidelink resources not in the reselection candidate resource set, in a case where a maximum number $N_{max}$ of resources that the sidelink control information is able to indicate is 2 or 3 and a sidelink resource not in the reselection candidate resource set is an (i+1)-th or (i+2)-th sidelink resource, reselection is performed on the (i+1)-th or (i+2)-th sidelink resource, a sidelink resource is reselected from the sidelink resource set based on time frequency resources of the i-th sidelink resource and the (i+2)-th sidelink resource to an $N_1$-th sidelink resource; where, $1 \leq i \leq N_1 - 2$, $N_1$ being the number of the initially selected sidelink resources, and in a case where a time interval between the i-th sidelink resource and the (i+2)-th sidelink resource is within a predetermined range, the reselected sidelink resource satisfies the following condition that:

a time interval between the reselected sidelink resource and at least one of the i-th sidelink resource and the (i+2)-th sidelink resource to the $N_1$-th sidelink resource is within the predetermined range, and the reselected sidelink resource is not at the same slot as any one of the i-th sidelink resource and the (i+2)-th sidelink resource to the $N_1$-th sidelink resource.

2. The apparatus according to claim 1, wherein the first processor circuitry performs the resource re-evaluation at a time point before an i-th initially selected sidelink resource, and determines that one or more sidelink resources of sidelink control information are not in the reselection candidate resource set; where, i is an integer; and the second processor circuitry performs resource reselection on the one or more sidelink resources not in the reselection candidate resource set and subsequent candidate resources one by one, and selects an (n+1)-th sidelink resource in a case where there are n reselected resources; where, $1 \leq n \leq N-1$, N being the number of a sidelink resource at the same slot as the sidelink control information and subsequent resources in the initially selected sidelink resources selected in an initial selection process;

wherein former n sidelink resources and one or more sidelink resources at the same slot as the n-th sidelink resource are excluded from the sidelink resource set to form a first set, sidelink resources in the sidelink resource set having a time interval between them and at least one sidelink resource in the selected former n sidelink resources within a predetermined range are taken as a second set, and the (n+1)-th sidelink resource is randomly selected with equal probability from an intersection of the first set and the second set.

3. The apparatus according to claim 2, wherein a sidelink resource at the same slot as a physical sidelink control channel of the sidelink control information is taken as a sidelink resource selected at a first time of the resource reselection.

4. The apparatus according to claim 3, wherein in a case where another sidelink resource is reserved by the sidelink control information, the another sidelink resource is not subjected to reselection and is taken as a sidelink resource selected at a second time of the resource reselection.

5. The apparatus according to claim 2, wherein in a case where another sidelink resource is reserved by the sidelink control information, the another sidelink resource is not subjected to reselection and is taken as a sidelink resource selected at the first time of the resource reselection; and the sidelink resource at the same slot as the physical sidelink control channel of the sidelink control information is taken as the sidelink resource selected at the second time of the resource reselection.

6. The apparatus according to claim 1, wherein, in a case where the time interval between the i-th sidelink resource and the (i+2)-th sidelink resource is not within the predetermined range, the reselected sidelink resource satisfies the following conditions that:

a time interval between the reselected sidelink resource and at least one of the ith sidelink resource and the (i+2)-th sidelink resource to the $N_1$-th sidelink resource is within the predetermined range, and the reselected sidelink resource is not at the same slot as any one of the i-th sidelink resource and the (i+2)-th sidelink resource to the $N_1$-th sidelink resource; and time intervals between the reselected sidelink resource and the i-th sidelink resource and the (i+2)-th sidelink resource are all within the predetermined range, and the reselected sidelink resource is temporally after the i-th sidelink resource and before the (i+2)-th sidelink resource;

in a case where the maximum number $N_{max}$ of resources that the sidelink control information is able to indicate is 2 or 3 and the sidelink resource not in the reselection candidate resource set is the $N_1$-th sidelink resource, the reselected sidelink resource satisfies the following conditions that:

a time interval between the reselected sidelink resource and at least one of the i-th sidelink resource to the $(N_1-1)$-th sidelink resource is within the predetermined range, and the reselected sidelink resource is not at the same slot as any one of the i-th sidelink resource to the $(N_1-1)$-th sidelink resource; and the reselected sidelink resource further satisfies the following conditions that: HARQ-ACK bits for the reselected sidelink resource and any one of a first to the $N_1$-th sidelink resources are not fed back together by physical sidelink feedback channels of a same slot, and the slot is not within a period of time after a slot where a physical sidelink feedback channel to which any one of the resources corresponds is at.

7. The apparatus according to claim 1, wherein the reselected sidelink resource further satisfies the following condition that: the reselected sidelink resource is after a sidelink resource which is at the same slot as the physical sidelink control channel of the sidelink control information.

8. The apparatus according to claim 1, wherein in a case where the maximum number $N_{max}$ of resources that the sidelink control information is able to indicate is 3 and the sidelink resources not in the reselection candidate resource set are the (i+1)-th and (i+2)-th sidelink resources, reselection is performed on the (i+1)-th and (i+2)-th sidelink resources;

wherein two sidelink resources are selected from the sidelink resource set based on time frequency resources of the i-th sidelink resource and a (i+3)-th sidelink resource to the $N_1$-th sidelink resource; where, $1 \leq i \leq N_1 - 3$, $N_1$ being the number of the multiple initially selected sidelink resources.

9. The apparatus according to claim 8, wherein in a case where a time interval between the i-th sidelink resource and the (i+3)-th sidelink resource is not within the predetermined range, the first sidelink resource of the two reselected sidelink resources satisfies the following conditions that:

a time interval between the first sidelink resource and at least one of the i-th sidelink resource and the (i+3)-th sidelink resource to the $N_1$-th sidelink resource is within the predetermined range, and the first sidelink resource is not at the same slot as any one of the i-th sidelink resource and the (i+3)-th sidelink resource to the $N_1$-th sidelink resource; and a time interval between the first sidelink resource and the i-th sidelink resource or the (i+3)-th sidelink resource is within the predetermined range, and the first sidelink resource is temporally after the i-th sidelink resource and before the (i+3)-th sidelink resource;

the second sidelink resource of the two reselected sidelink resources satisfies the following conditions that:

in a case where a time interval between the first sidelink resource and the i-th sidelink resource is within the predetermined range, time intervals between the second sidelink resource and the first sidelink resource and the (i+3)-th sidelink resource are all within the predetermined range, and the second sidelink resource is temporally after the i-th sidelink resource and before the (i+3)-th sidelink resource; and in a case where a time interval between the first sidelink resource and the (i+3)-th sidelink resource is within the predetermined range, time intervals between the second sidelink resource and the first sidelink resource and the i-th sidelink resource are all within the predetermined range, and the second sidelink resource is temporally after the i-th sidelink resource and before the (i+3)-th sidelink resource;

in a case where the maximum number $N_{max}$ of resources that the sidelink control information is able to indicate is 3 and the sidelink resources not in the reselection candidate resource set are the $(N_1-1)$-th and $N_1$-th sidelink resources, the first sidelink resource of the two reselected sidelink resources satisfies the following conditions that: a time interval between the first sidelink resource and at least one of the i-th sidelink resource to an $(N_1-2)$-th sidelink resource is within the predetermined range, and the first sidelink resource is not at the same slot as any one of the i-th sidelink resource to the $(N_1-2)$-th sidelink resource;

the second sidelink resource of the two reselected sidelink resources satisfies the following conditions that: a time interval between the second sidelink resource and at least one of the i-th sidelink resource to the $(N_1-2)$-th sidelink resource and the first sidelink resource is within the predetermined range, and the second sidelink resource is not at the same slot as any one of the i-th sidelink resource to the $(N_1-2)$-th sidelink resource and the first sidelink resource; and the two reselected sidelink resources satisfy the following conditions that: the two reselected sidelink resources and any one of the first to the $N_1$-th sidelink resources are not fed back together by the physical sidelink feedback channels of a same slot, and the slot is not within a period of time after the slot where the physical sidelink feedback channel to which any one of the resources corresponds is at.

10. The apparatus according to claim 1, wherein the first processor circuitry performs the pre-emption check on a j-th initially selected sidelink resource and subsequent sidelink resources, and determines that one or more sidelink resources of sidelink control information are not in the reselection candidate resource set; where, j is an integer; and the second processor circuitry performs resource reselection on the one or more sidelink resources not in the reselection candidate resource set and subsequent candidate resources one by one, and selects an (m+1)-th sidelink resource in a case where the number of the reselected resources is m; where, $1 \leq m \leq M-1$, M being the number of resources in the multiple initially selected sidelink resources after a sidelink resource at the same slot as the sidelink control information;

wherein former m sidelink resources and sidelink resources at the same slot as an m-th sidelink resource are excluded from the sidelink resource set to form a first set, sidelink resources in the sidelink resource set having a time interval between them and at least one sidelink resource in the selected former m sidelink resources within the predetermined range are taken as a second set, and the (m+1)-th sidelink resource is randomly selected with equal probability from an intersection of the first set and the second set.

11. The apparatus according to claim 10, wherein in a case where another sidelink resource is reserved by the sidelink control information, the another sidelink resource is taken as a sidelink resource selected at a first time of the resource reselection, and resources in the resource reselection are after the another sidelink resource.

12. The apparatus according to claim 1, wherein the first processor circuitry performs the pre-emption check on a j-th initially selected sidelink resource and subsequent sidelink resources, and determines that one or more sidelink resources of sidelink control information are not in the reselection candidate resource set; where, j is an integer; and the second processor circuitry performs resource reselection on the one or more sidelink resources not in the reselection candidate resource set.

13. The apparatus according to claim 12, wherein in a case where a maximum number $N_{max}$ of resources that the sidelink control information is able to indicate is 2 or 3 and the sidelink resource not in the reselection candidate resource set is a j-th sidelink resource, reselection is performed on the j-th sidelink resource;

wherein a sidelink resource is reselected from the sidelink resource set based on time frequency resources of a (j+1)-th sidelink resource to the $N_1$-th sidelink resource; where, $1 \leq j \leq N_1-1$, $N_1$ being the number of the multiple initially selected sidelink resources.

14. The apparatus according to claim 13, wherein the reselected sidelink resource satisfies the following conditions that:

a time interval between the reselected sidelink resource and at least one of the (j+1)-th sidelink resource to the $N_1$-th sidelink resource is within the predetermined range, and the reselected sidelink resource is not at the same slot as any one of the (j+1)-th sidelink resource to the $N_1$-th sidelink resource; and the reselected sidelink resource further satisfies the following conditions that: HARQ-ACK bits for the reselected sidelink resource and any one of a first to the $N_1$-th sidelink resources are not fed back together by physical sidelink feedback channels of a same slot, and the slot is not within a period of time after a slot where a physical sidelink feedback channel to which any one of the resources corresponds is at.

15. The apparatus according to claim 13, wherein the maximum number $N_{max}$ of resources that the sidelink control information is able to indicate is 3, the reselected sidelink resource further satisfies the following conditions that:

the reselected sidelink resource is after another sidelink resource indicated by the same sidelink control information, and the another sidelink resource is within the reselection candidate resource set and after a slot of the sidelink control information.

16. The apparatus according to claim 12, wherein in a case where a maximum number $N_{max}$ of resources that the sidelink control information is able to indicate is 3 and sidelink resources not in the reselection candidate resource set are the j-th and the (j+1)-th sidelink resources, reselection is performed on the j-th and the (j+1)-th sidelink resources;

wherein two sidelink resources are selected from the sidelink resource set based on time frequency resources of a (j+2)-th sidelink resource to the $N_1$-th sidelink resource; where, $1 \leq j \leq N_1-2$, $N_1$ being the number of the multiple initially selected sidelink resources;

the first sidelink resource of the two reselected sidelink resources satisfies the following conditions that:

a time interval between the first sidelink resource and at least one of the (j+2)-th sidelink resource to the $N_1$-th sidelink resource is within the predetermined range, and the first sidelink resource is not at the same slot as any one of the (j+2)-th sidelink resource to the $N_1$-th sidelink resource;

the second sidelink resource of the two reselected sidelink resources satisfies the following conditions that:

a time interval between the second sidelink resource and at least one of the (j+2)-th sidelink resource to the $N_1$-th sidelink resource and the first sidelink resource is within the predetermined range, and the second sidelink resource is not at the same slot as any one of the (j+2)-th sidelink resource to the $N_1$-th sidelink resource and the first sidelink resource; and the two reselected sidelink resources satisfy the following conditions that: the two reselected sidelink resources and any one of the first to the $N_1$-th sidelink resources are not fed back together by the physical sidelink feedback channels of a same slot, and the slot is not within a period of time after the slot where the physical sidelink feedback channel to which any one of the resources corresponds is at.

17. The apparatus according to claim 1, wherein time intervals between the reselected sidelink resources and a slot where the physical sidelink control channel of the sidelink control information are greater than or equal to a predetermined value; and/or for a reselection sidelink resource of which retransmission is enabled based on hybrid automatic repeat request feedback, in a case where the reselection sidelink resource is fed back together with any selected resource by physical sidelink feedback channels at the same slot or the reselection sidelink resource is within a period of time when a physical sidelink feedback channel to which any selected resource corresponds performs decoding, the retransmission of the reselection sidelink resource based on the hybrid automatic repeat request feedback is disabled, or retransmission of all reselection sidelink resources based on the hybrid automatic repeat request feedback are disabled.

18. A sidelink resource reselection method, comprising:

performing resource re-evaluation and/or pre-emption check on sidelink resources initially selected for performing a plurality of times of transmission of a transport block; and reselecting one or more sidelink resources from a sidelink resource set in a case where the one or more sidelink resources are not in a reselection candidate resource set; wherein, after reselection, a sidelink resource for retransmission can be indicated by a sidelink control information, and a time gap between a re-selected sidelink resource and a sidelink resource is ensured such that the re-selected sidelink resource is not within a time after a slot where a physical sidelink feedback channel to which the sidelink resource corresponds is at, wherein the sidelink resource reselection method further comprising:

performing the resource re-evaluation at a time point before the i-th initially selected sidelink resource, and determining that one or more sidelink resources of the sidelink control information are not in the reselection candidate resource set; where, i is an integer, and performing resource reselection on the one or more sidelink resources not in the reselection candidate resource set, wherein in a case where a maximum number $N_{max}$ of resources that the sidelink control information is able to indicate is 2 or 3 and a sidelink resource not in the reselection candidate resource set is an (i+1)-th or (i+2)-th sidelink resource, reselection is performed on the (i+1)-th or (i+2)-th sidelink resource, wherein a sidelink resource is reselected from the sidelink resource set based on time frequency resources of the i-th sidelink resource and the (i+2)-th sidelink resource to an $N_1$-th sidelink resource; where, $1 \leq i \leq N_1 - 2$, $N_1$ being the number of the initially selected sidelink resources, and wherein in a case where a time interval between the i-th sidelink resource and the (i+2)-th sidelink resource is within a predetermined range, the reselected sidelink resource satisfies the following condition that:

a time interval between the reselected sidelink resource and at least one of the i-th sidelink resource and the (i+2)-th sidelink resource to the $N_1$-th sidelink resource is within the predetermined range, and the reselected sidelink resource is not at the same slot as any one of the i-th sidelink resource and the (i+2)-th sidelink resource to the $N_1$-th sidelink resource.

* * * * *